United States Patent
Filmeyer

(10) Patent No.: US 12,323,665 B2
(45) Date of Patent: Jun. 3, 2025

(54) SYSTEMS AND METHODS FOR RESUMING A MEDIA ASSET

(71) Applicant: Adeia Guides Inc., San Jose, CA (US)

(72) Inventor: Samuel Filmeyer, Cambridge, MA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/754,959

(22) Filed: Jun. 26, 2024

(65) Prior Publication Data
US 2024/0430532 A1    Dec. 26, 2024

Related U.S. Application Data

(63) Continuation of application No. 17/983,196, filed on Nov. 8, 2022, now Pat. No. 12,058,417, which is a
(Continued)

(51) Int. Cl.
| | |
|---|---|
| *H04N 21/236* | (2011.01) |
| *G06F 16/783* | (2019.01) |
| *H04N 21/262* | (2011.01) |
| *H04N 21/431* | (2011.01) |
| *H04N 21/433* | (2011.01) |
| *H04N 21/44* | (2011.01) |

(Continued)

(52) U.S. Cl.
CPC ..... *H04N 21/47217* (2013.01); *G06F 16/783* (2019.01); *H04N 21/431* (2013.01); *H04N 21/44008* (2013.01); *H04N 21/8456* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |

(Continued)

FOREIGN PATENT DOCUMENTS

JP    2001309294 A    11/2001

OTHER PUBLICATIONS

International Search Report and Written Opinion for PCT Application No. PCT/US2016/058648 dated Jul. 4, 2017.
(Continued)

*Primary Examiner* — Brian T Pendleton
*Assistant Examiner* — Jean D Saint Cyr
(74) *Attorney, Agent, or Firm* — Haley Guiliano LLP

(57) ABSTRACT

Systems and methods address shortcomings in conventional systems by resuming a media asset from a logical point. In some aspects, the systems and methods receive a first input at a first time from a user to pause a media asset at a first position and a second input at a second time from the user to resume the media asset. The systems and methods further determine whether a time period between the first and the second time exceeds a threshold time period. In response to determining that the time period does not exceed the threshold time period, the systems and methods generate the media asset for display beginning at the first position. However, in response to determining that the time period exceeds the threshold, the systems and methods generate the media asset for display beginning at a second position preceding the first position.

20 Claims, 9 Drawing Sheets

Related U.S. Application Data continuation of application No. 17/382,669, filed on Jul. 22, 2021, now Pat. No. 11,516,548, which is a continuation of application No. 16/067,042, filed as application No. PCT/US2016/058652 on Oct. 25, 2016, now Pat. No. 11,109,106.

(51) Int. Cl.
 *H04N 21/472* (2011.01)
 *H04N 21/482* (2011.01)
 *H04N 21/845* (2011.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 9,182,940 B1 | 11/2015 | Chen et al. |
| 9,558,784 B1 | 1/2017 | Gray et al. |
| 9,641,912 B1 | 5/2017 | Morisetti |
| 10,893,319 B2 | 1/2021 | Filmeyer |
| 11,109,106 B2 | 8/2021 | Filmeyer |
| 12,058,417 B2 | 8/2024 | Filmeyer |
| 2002/0163532 A1 | 11/2002 | Thomas et al. |
| 2002/0174430 A1 | 11/2002 | Ellis et al. |
| 2004/0152054 A1 | 8/2004 | Gleissner et al. |
| 2004/0152055 A1 | 8/2004 | Gliessner et al. |
| 2005/0166258 A1 | 7/2005 | Vasilevsky et al. |
| 2005/0168640 A1 | 8/2005 | Jeon et al. |
| 2005/0251827 A1 | 11/2005 | Ellis et al. |
| 2006/0002261 A1 | 1/2006 | Fujita |
| 2007/0089147 A1* | 4/2007 | Urdang ............. H04N 21/4722 348/E7.071 |
| 2009/0158326 A1 | 6/2009 | Hunt et al. |
| 2009/0175596 A1 | 7/2009 | Hirai |
| 2009/0292672 A1 | 11/2009 | Kunjithapatham et al. |
| 2009/0310021 A1 | 12/2009 | Kondo et al. |
| 2010/0153885 A1 | 6/2010 | Yates |
| 2011/0301728 A1 | 12/2011 | Hamilton et al. |
| 2012/0158765 A1 | 6/2012 | Kumar et al. |
| 2013/0251337 A1 | 9/2013 | Abecassis |
| 2014/0067825 A1 | 3/2014 | Oztaskent et al. |
| 2014/0101707 A1* | 4/2014 | Kishore ............. H04N 21/8456 725/86 |
| 2014/0150002 A1 | 5/2014 | Hough et al. |
| 2015/0036997 A1 | 2/2015 | Omori |
| 2015/0356997 A1* | 12/2015 | Wang ................... H04N 7/0885 386/240 |
| 2015/0365736 A1 | 12/2015 | Xiong et al. |
| 2017/0235729 A1 | 8/2017 | Hughes et al. |
| 2018/0014074 A1 | 1/2018 | Li |
| 2019/0238928 A1 | 8/2019 | Filmeyer |
| 2021/0352374 A1 | 11/2021 | Filmeyer |
| 2023/0078412 A1 | 3/2023 | Filmeyer |

OTHER PUBLICATIONS

PCT International Search Report and Written Opinion for International Application No. PCT/US2020/015945, dated Jun. 4, 2020.

\* cited by examiner

```
1    <name>THE DEBATE</name>
2    <channel>CSBC5</channel>
3    <date>July 01, 2016</date>
4    <ID>1123581321</ID>

5    <segment>
6    <time>00:00:32</time>
7    <name>Introduction</name>
8    <social_media>https://xyz.cba.xyz/Intro</social_media>
9    <end_time>00:03:11</end_time>
10   </segment>

11   <advertisement>
12   <time>00:03:11</time>
13   <name>Wall Masonry of Texas</name>
14   <end_time>00:05:31</end_time>
15   </advertisement>

16   <scene_1>
17   <time>00:05:31</time>
18   <name>First Question</name>
19   <social_media>https://xyz.cba.xyz/1stQ</social_media>
20   <end_time>00:29:14</end_time>
21   </scene_1>
```

SYSTEMS AND METHODS FOR RESUMING A MEDIA ASSET

CROSS-REFERENCE TO RELATED APPLICATIONS

This application is a continuation of U.S. patent application Ser. No. 17/983,196, filed Nov. 8, 2022, which is a continuation of U.S. patent application Ser. No. 17/382,669, filed Jul. 22, 2021, (now U.S. Pat. No. 11,516,548) which is a continuation of U.S. patent application Ser. No. 16/067,042, filed Jun. 28, 2018, (now U.S. Pat. No. 11,109,106), which is a national stage application under 35 U.S.C. § 371 of International Application PCT/US2016/058652, filed Oct. 25, 2016 which are hereby incorporated by reference herein in their entireties.

BACKGROUND

Conventional media systems can pause and resume programs. In some cases, conventional media systems can also create bookmarks on multimedia presentations and save these bookmarks for later access. For example, a user watching a television show can bookmark his current viewing progress of an on-demand program if he or she has to attend to something urgent, and return to it at a later time. However, the pause or bookmark may occur in the middle of a scene or a sentence. This may cause confusion for the user when he returns to the program some time later. The user might not instantly remember where he left off in the program. In such conventional media systems, the user must either try to recall the plot as the program continues or manually rewind the program to a previous scene that he does remember.

SUMMARY

Systems and methods are described to address shortcomings in conventional media systems by resuming a paused media asset from a logical point. A logical point in a paused media asset is a position (usually different from the paused position) that helps the user viewing the media asset to recall the context of the media asset after he or she resumes it sometime later. The logical point may be different depending on the context of the media asset and the user. In some embodiments, once the user has paused the media asset, a media guidance application automatically analyzes the paused position (or "pause point") of the media asset to determine if it is in the middle of a sentence. In some embodiments, the determination may be based on metadata associated with the media asset that outlines the time stamps for each and every sentence in the media asset. In some other embodiments, the media guidance application may rely on speech recognition and/or natural language processing (NLP) rules to determine whether the user paused in the middle of a sentence. In some embodiments, the media guidance application may use a combination of metadata and NLP rules to make this determination.

In some embodiments, if the media guidance application has determined that the paused position of the media asset is in the middle of a sentence, the media guidance application may determine a position within the media asset that corresponds to the start of the paused sentence. This determination may be based on the metadata associated with the media asset, speech recognition using NLP rules, or a combination of the two. Once the media guidance application has determined where the start of the sentence is, it may receive a subsequent user instruction to resume the media asset. Instead of resuming the media asset from where it was paused, the media guidance application may automatically resume from the start of the sentence, thereby allowing the user to recall more easily what he was watching by having a buffer period for him to adjust.

In some embodiments, in addition to determining if the media asset is paused in the middle of a sentence, the media guidance application may determine whether the media asset is paused in the middle of a plot line, a scene, or a particular character or speaker's unfinished line. In some embodiments, the media guidance application may implement a playback hierarchy to make this determination. For example, the playback hierarchy may contain time stamps for every plot line, scene change, character movements, speaker lines, and sentences in the media asset. Of course, the playback hierarchy could also include a subset of the above-listed information, or any other playback information associated with the media asset. In some embodiments, this playback hierarchy may be included in the metadata of the media asset, such that the media guidance application receives the playback hierarchy along with the metadata from a remote server.

With the playback hierarchy, the media guidance application may resume the media asset after receiving a user input to do so, by generating the media asset for display from the beginning of the cut-off scene, the beginning of the cut-off line of a particular speaker, the most recent change of speaker, and so on. For example, the media guidance application may determine that Linda, a speaker in the on-demand program, is completing her last sentence in a debate with James, another speaker in the on-demand program when it receives an input from the user to pause the on-demand program. Upon receiving a further user input to resume the paused on-demand program, the media guidance application may resume from the beginning of Linda's cut-off sentence, the beginning of the very first sentence that Linda speaks in this debate scene, the beginning of the debate scene, or any of a number of different starting points, in order to give the user a reminder of the on-demand program's context and resume from a logical point for the user.

In some embodiments, the media guidance application may determine what the logical starting point for the user under his or her current situation is by keeping track of how long the user has been away for. For example, if the user has only been away for a few seconds, the media guidance application may simply resume from the same point as the paused position of the media asset, because the user may still have a vivid memory of where he paused the media asset. If, in another example, the media guidance application determines that the user has been away for a few hours, the media guidance application may resume the media asset from further back, such as from the beginning of the current speaker's lines. In a further example, if the media guidance application determines that the user has been away for days, the media guidance application may resume the media asset from the beginning of the scene, or even from the beginning of the media asset itself, to give the user more information to recall.

In some embodiments, the media guidance application may allow the user to customize how far back to resume a media asset as a function of his length of absence. For example, the media guidance application may receive user selection to resume the media asset from the same point as the paused position if the user has been away for less than two minutes, and resume the media asset from the start of the scene if he has been away for two hours or more. In some embodiments, the user customization of how far back to resume need not be configured as a function of his absence and can, instead, be an absolute time period. For example, the media guidance application may receive user input to configure his settings on these issues. According to the user's settings, the media guidance application may resume the media asset from a position that is 30 seconds before the paused position if he has been away for less than an hour, and resume from a point that is 5 minutes before the paused position if he has been away for longer than half a day. In some embodiments, the media guidance application may perform a temporal "snap-in" when resuming the media asset from a fixed time period before the paused position in order to avoid starting from the middle of a sentence. For example, if the media guidance application resumed a paused on-demand program from a point in time that is 5 minutes before the paused position, based on the user's settings, and the point happens to cut into the middle of a sentence (or the middle of a particular character's line, etc.), the media guidance application may go back a little further to the beginning of the sentence (or the beginning of the line, etc.) to produce a logical starting point, despite the user's configuration of 5 minutes.

In some embodiments, the media guidance application may receive the user's input to pause the media asset from a first device and receive the user's input to resume the media asset from a second device. For example, the media guidance application may determine that a user has watched the on-demand program for 30 minutes on a television before pausing it and, subsequently, turned to his cell phone to resume watching the same on-demand program there. In some embodiments, the media guidance application may perform the same methods as described above, by resuming the media asset for the user, on the second device, from a position before the paused position on the first device depending on how long the user has been away for. In some other embodiments, the media guidance application running on the first device may receive the user input to resume the media asset, whereby the user input may specifically demand resuming the media asset from the second device. For example, the media guidance application running on the television may receive user input to pause the on-demand program, and later on receive another user input to resume the on-demand program on the user's connected cell phone. Responsive to the user input on the television, the media guidance application running on the user's cell phone may automatically begin playing the on-demand program from a logical position, as defined in the various embodiments in the present disclosure.

In some embodiments, after receiving the user's input to pause a media asset, the media guidance application may monitor the user's subsequent viewing of the same media asset to determine how far back to resume. For example, the media guidance application may determine that the user first began watching the on-demand program on a television and paused after 30 minutes, resumed the on-demand program a few hours later on a cell phone and paused again after 20 minutes, and finally resumed the on-demand program two days later on the television again. In this example, the media guidance application may take into account the user's viewing of the on-demand program on the cell phone in calculating how far back to resume the on-demand program on the television. The time period that the user has been away for since the last time he accessed the on-demand program (i.e., from the cell phone) will be used to determine how far back to resume the on-demand program on the television. In some other embodiments, the total amount of time that the user has been away for from the first device may alternatively be used by the media guidance application to determine how far back to resume the on-demand program.

In some aspects, the systems and methods described provide for resuming a media asset. A media guidance application may extract metadata associated with the media asset. The metadata includes a plurality of positions in the media asset. For example, the media guidance application may receive an on-demand program on the first presidential debate of the year when a user selects the program for display. The media guidance application may extract metadata associated with the on-demand program that contains six segments of videos lasting for a total of 90 minutes. The metadata in this example may include, among other things, time stamps corresponding to the start time and end time for each segment, for each candidate's response, and for each sentence. For consistency, we assume that the on-demand program as used in this example runs from 00:00:00 to 01:30:00.

In some embodiments, the media guidance application may receive a first input from a user to pause the media asset at a first position of the plurality of positions. For example, the media guidance application may receive an input from a user to pause the on-demand program halfway through the debate. The paused first position may correspond to 01:02:01, a time stamp among a plurality of time stamps. In some embodiments, the plurality of time stamps may be all the time stamps available from the metadata associated with the media asset, that is, each and every time stamp within the range of 00:00:00 and 01:30:00.

In some embodiments, based on receiving the first input from the user, the media guidance application may store the first position in a bookmark for the media asset, determine that the first position in the media asset corresponds to a middle of a sentence based on the metadata, determine a second position of the plurality of positions in the media asset corresponding to a start of the sentence based on the metadata, and update the bookmark to include the second position. For example, based on receiving the first input from the user to pause the on-demand program at 01:02:01, the media guidance application may store the first position (e.g., "01:02:01") in the bookmark. The media guidance application may subsequently determine that the first position corresponds to the middle of a sentence based on the metadata, which, as described above, contains the start and end times of each sentence in the on-demand program. In this particular example, the media guidance application may determine from the metadata that a sentence being spoken by one of the characters runs from 01:01:59 to 01:02:21. Based on the metadata, the media guidance application may determine the start of the paused sentence is at 01:01:59, and update the bookmark from the first position ("01:02:01") to the second position ("01:01:59").

In some embodiments, the media guidance application may update the bookmark to include the second position by removing the first position from the bookmark for the media asset, and inserting the second position in the bookmark. For example, the media guidance application may update the bookmark by removing the first position ("1:02:01") from the bookmark and inserting the second position ("1:01:59") into the bookmark.

In some embodiments, the media guidance application may receive a second input from the user to resume the media asset. Based on receiving the second input from the user, the media guidance application may generate the media asset for display from the bookmark. For example, the media guidance application may receive a second input from the user a few minutes after receiving the first input to pause the program, in order to resume the on-demand program. Based on receiving the second input, the media guidance application may generate the program for display from the bookmarked second position ("01:01:59") that corresponds to the beginning of the sentence that was cut off by the pause.

In some embodiments, the media guidance application may determine that the first position in the media asset corresponds to the middle of the sentence by determining, based on the metadata, a third position of the plurality of positions in the media asset corresponding to an end of the sentence, and comparing the first position against the second and the third positions to determine that the first position is before the third position and is after the second position. Continuing from the above examples, the media guidance application may determine that the paused sentence at the first position ("01:02:01") has a third position corresponding to the end of the sentence ("01:02:21"). The media guidance application may compare the first position ("01:02:01") against the second ("01:01:59") and third ("01:02:21") positions to determine that the first position is before the third position and is after the second position. Based on this, the media guidance application is able to determine that the paused position cuts a sentence in the middle.

In some embodiments, the metadata associated with the media asset may include caption text. The media guidance application may determine that the first position in the media asset corresponds to the middle of the sentence by analyzing the caption text to determine the sentence corresponding to the first position, and applying a grammar rule to the sentence corresponding to the first position to determine that the sentence is incomplete. In some embodiments, the metadata associated with the on-demand debate program may include on-screen caption and/or subtitles that are either manually entered or automatically generated for the program. In some other embodiments, the metadata may not include on-screen caption, and the media guidance application may implement a speech recognition module to automatically convert the audio stream of the program into caption text. For example, the media guidance application may analyze the caption text to determine the sentence corresponding to the first position ("01:02:01") where the media asset is paused, and apply one or more grammar rules to the sentence to determine if it is incomplete. In some embodiments, the media guidance application may carry out the grammatical analysis of the speech-converted caption text independent of the analysis using metadata associated with the media asset. For example, the media guidance application may parse an audio stream of the media asset into sentences and apply grammar rules to test whether each and every element of a sentence (e.g., subject, verb, and object) are present in the sentences. In this example, the parsing and grammar analysis are performed independent of the metadata associated with the media asset. In some other embodiments, the grammatical analysis may be carried out to supplement the metadata analysis. For example, the media guidance application may carry out analysis of the sentence at the first position using both the metadata, which includes on-screen caption, and the speech recognition module, in the event that there is a mismatch between the on-screen caption included in the metadata and the speech-converted caption text as derived from the speech recognition module.

In some embodiments, the metadata associated with the media asset further includes a field for a current speaker of the media asset and an indication of a start of the current speaker's line. For example, the metadata associated with the on-demand program may include a field for a current speaker, such as James, as well as an indication of a start of the current speaker's line, such as a starting time stamp for James' line (e.g., "01:00:52") in a debate scene with Linda. Here, the starting time stamp for James' line refers to the time stamp corresponding to the beginning of one of James' continuous lines. In a hypothetical debate between James and Linda, which runs from 01:00:52 to 01:33:21. James may begin with a first sentence from 01:00:52 to 01:01:01 and a second sentence from 01:01:01 to 01:01:03. Linda may respond with a sentence from 01:01:12 to 01:01:51 followed by a sentence from 01:01:59 to 01:02:21. In accordance with the embodiments discussed above, if the media guidance application pauses the debate at 01:02:01 (i.e., in the middle of Linda's second sentence during the debate), the starting time stamp of Linda's line would be 01:01:12 (i.e., the beginning of her first sentence), whereas the start time of Linda's second sentence would be 01:01:59.

In some embodiments, the media guidance application may receive a third input from the user to pause the media asset at a third position, and receive a fourth input from the user to resume the media asset. Based on receiving the fourth input from the user to resume the media asset, the media guidance application may determine the current speaker whose line is paused at the third position, and generate the media asset for display at the start of the current speaker's line. For example, the media guidance application may receive a further input from the user to pause the on-demand program at a third position ("01:02:01"), and, subsequently, receive a fourth input from the user to resume the program. Based on receiving the fourth input from the user, the media guidance application may determine that Linda is the speaker who is currently reciting a line when the input to pause is received, and resume the program from the start of Linda's lines ("01:01:12").

In some embodiments, the metadata associated with the media asset includes a field for playback information of a recent scene. For example, the metadata associated with the on-demand program may include playback information, such as start and stop time stamps, for the debate scene. In some embodiments, the media guidance application may receive a third input from the user to pause the media asset, and receive a fourth input form the user to resume the media asset. In response to receiving the fourth input from the user to resume the media asset, the media guidance application may analyze the playback information of the recent scene to determine a start of the recent scene, and generate the media asset for display at the start of the recent scene. For example, the media guidance application may analyze the playback information of the debate scene to determine its starting time stamp. The starting time stamp of the debate scene may be 01:00:52, when James first started the debate with Linda. Based on receiving the fourth input from the user to resume the media asset, the media guidance application may generate the on-demand program for display beginning at the starting time stamp of the debate scene.

In some embodiments, the start of the recent scene corresponds to a start of a recent chapter, a start of a recent episode, or a start of the media asset. For example, the term "recent scene" may be broadly defined to include not just a theatrical scene, but may refer to a scene of a movie, a chapter of a program or movie, an episode of a program series, or a media asset itself. Consequently, the start of the recent scene may refer to the starting time stamp of a scene, a chapter, an episode, or a media asset.

In some embodiments, the media guidance application may determine a time period between receiving the third input to pause the media asset and receiving the fourth input to resume the media asset, and compare the time period against a threshold time period. In response to determining that the time period is greater than the threshold time period, the media guidance application may generate the media asset for display at the start of the recent scene. In response to determining that the time period is not greater than the threshold, however, the media guidance application may generate the media asset for display from the first position. For example, the media guidance application may keep track of the amount of time that the user has paused the on-demand program by determining a time period between receiving an input to pause the program and receiving another input to resume the program. The media guidance application may then compare the time period against a threshold time period to determine whether the time period exceeds the threshold time period. If the media guidance application determines that the threshold time period is exceeded, the media guidance application may resume the on-demand program beginning from the start of the recent scene ("01:00:52" of the debate scene), as discussed in the preceding example. If, however, the threshold time period is not exceeded, the media guidance application may resume the on-demand program beginning from the same position where it is paused (the paused position at "01:02:01").

In some embodiments, the media guidance application may generate for display to the user a plurality of options, wherein each option of the plurality of options corresponds to a threshold time period. For example, the media guidance application may let the user decide how to configure the threshold time period, and display a number of options each corresponding to a potential threshold time period for the user to select. In some embodiments, the media guidance application may receive a user selection of an option from the plurality of options, wherein the selected option designates a corresponding threshold time period that the user is allowed to be absent for without resuming the media asset from an earlier position. For example, the media guidance application may notify the user at a settings page that a selection of a particular time period as a threshold time period would cause the system to resume a paused on-demand program from an earlier position if the user has paused the program for longer than the threshold time period. The media guidance application may receive further user input in the settings page to configure other behaviors related to the pause-resume features.

In some embodiments, the media guidance application may receive the first input from the user with a media device and may receive the second input from the user to resume the media asset with a different media device than the media device used to receive the first input. For example, the media guidance application may be implemented on two different media devices: a television and a cell phone. The media guidance application implemented on the television may receive the first user input to pause the on-demand program, e.g., at the end of James' lines in the above-described debate scene. Thereafter, the media guidance application implemented on the cell phone may receive the second user input to resume the on-demand program. Here, the features and embodiments as described above are equally applicable. For example, the media guidance application may receive the user input to pause the on-demand program at 01:02:01, in the middle of Linda's second sentence in the debate scene, at the television. Subsequently, the media guidance application may resume the program at 01:01:59 (i.e., at the start of the sentence), at 01:01:12 (i.e., at the start of Linda's line), or at 01:00:52 (i.e., at the start of the debate scene) from the cell phone in response to receiving the user's input to resume the program from there.

In some aspects, the systems and methods described provide for resuming a media asset. In some embodiments, a media guidance application may receive, at a first time, a first input from a user to pause a media asset at a first position. For example, the media guidance application may receive a first input to pause a recorded program at position 01:02:01, at 7:00 AM. In some embodiments, the media guidance application may receive, at second time, a second input from the user to resume the media asset. For example, the media guidance application may receive a second input to resume the recorded program at 8:00 AM. In some embodiments, the media guidance application may determine whether a time period between the first time and the second time is greater than a threshold time period. For example, the media guidance application may determine the time period between 7:00 AM and 8:00 AM, i.e., one hour, is greater than a threshold time period (e.g., 30 minutes).

In some embodiments, in response to determining that the time period is greater than the threshold time period, the media guidance application may receive metadata from a database, wherein the metadata comprises a plurality of time stamps, each time stamp of the plurality of time stamps corresponding to a starting time of a plurality of scenes of the media asset, store the plurality of time stamps and the plurality of scenes as a playback hierarchy, determine a start of a recent scene of the media asset from the playback hierarchy based on the first position, set the start of the recent scene as a second position of the media asset, and generate the media asset for display beginning at the second position preceding the first position. Continuing with the example above from this aspect of the disclosure, the media guidance application may, in response to determining that the one-hour time period is greater than the threshold time period of 30 minutes, receive metadata associated with the recorded program from a remote media content database, the metadata comprising time stamps corresponding to scenes within the recorded program. The media guidance application may store the time stamps and the scenes of the recorded program as a playback hierarchy for the program. Based on the first position where the recorded program is paused ("01:02:01"), the media guidance application may determine a start of the debate scene (i.e., "01:00:52") and set the start of the debate scene as the second position to resume the recorded program from.

In some embodiments, in response to determining that the time period is not greater than the threshold time period, the media guidance application may generate the media asset for display beginning at the first position. For example, if the time period that the user is away for is not greater than the threshold time period of 30 minutes, the media guidance application may resume the recorded program from the first position, i.e., 01:02:01, where it is paused.

In some embodiments, the media guidance application may generate for display to the user a plurality of options, wherein each option of the plurality of options corresponds to a threshold time period. For example, the media guidance application may generate a plurality of threshold time periods as selectable options to the user, such as "5 minutes", "15 minutes", "30 minutes", "one day" etc. In some embodiments, the media guidance application may receive a user selection of an option from the plurality of options, wherein the selected option designates a corresponding threshold time period that the user is allowed to be absent for without resuming the media asset from an earlier position. For example, the media guidance application may receive a selection of "30 minutes" from the user, which designates that the user allowed to be absent for 30 minutes without the media guidance application automatically resuming the program from an earlier position when the user selects to resume it. In other words, the user's selection of "30 minutes" as the threshold time period would cause the media guidance application to resume the program from an earlier position (e.g., start of scene, start of line, etc.) when the user has paused the program for longer than the threshold time period.

In some embodiments, the metadata comprises data on a plurality of commercial breaks associated with the media asset. In some embodiments, the plurality of time stamps corresponds to end times of the plurality of commercial breaks. For example, in some on-demand programs, the metadata associated with a program includes information on commercial break data, which may be used as a proxy for scene or chapter hierarchy of the program. The time stamps of the plurality of positions in the playback hierarchy may correspond to the end times of the commercial breaks.

In some embodiments, the media guidance application may set the start of the recent scene as the second position of the media asset by determining from the playback hierarchy a first time stamp associated with the start of the recent scene, determine from the playback hierarchy a second time stamp associated with an end of the recent scene, compare the first position against the first and second time stamps, and, in response to determining that the first position is before the second time stamp and is after the first time stamp, assigning the first time stamp to the second position. For example, the media guidance application may set the starting time of the recent debate scene between Linda and James (i.e., "01:00:52") as a first time stamp and the end time of the debate scene (i.e., "01:33:21") as a second time stamp. In response to determining that the first position (i.e., "01:02:01", where the program is paused) is before the second time stamp and temporally after the first time stamp, the media guidance application may assign the first time stamp, i.e., "01:00:52" corresponding to the start of the debate scene, to the second position to be added to the bookmark.

In some embodiments, the start of the recent scene corresponds to a start of a recent sentence, a start of a recent chapter, a start of a recent episode, or a start of the media asset. For example, the term "recent scene" may be broadly defined to include not just a theatrical scene, but may refer to a sentence of a media asset, a scene of a movie, a chapter of a program or movie, an episode of a program series, or the media asset itself. Consequently, the start of the recent scene may refer to the starting time stamp of a sentence, a scene, a chapter, an episode, or a media asset.

In some embodiments, the first input from the user is received at the media device, and wherein the media asset is resumed at another media device. For example, as discussed before, the media guidance application may be implemented on two or more media devices, such that the pause and resume actions may be received by the media guidance application(s) implemented on different devices.

In some embodiments, the metadata associated with the media asset includes a field for a current speaker of the media asset and an indication of a start of the current speaker's line. In some embodiments, the media guidance application may receive a third input from the user to pause the media asset and receive a fourth input from the user to resume the media asset. Based on receiving the fourth input from the user to resume the media asset, the media guidance application may determine the current speaker whose line is paused at the first position, and generate the media asset for display at the start of the current speaker's line. For example, the metadata associated with the on-demand program may include a field for a current speaker, such as James, as well as an indication of a start of the current speaker's line, such as a starting time stamp for James' line (e.g., "01:00:52") in a debate scene with Linda. Here, the starting time stamp for James' line refers to the time stamp corresponding to the beginning of one of James' continuous lines. In the hypothetical debate between James and Linda, which runs from 01:00:52 to 01:33:21. James may begin with a first sentence from 01:00:52 to 01:01:01 and a second sentence from 01:01:01 to 01:01:03. Linda may respond with a sentence from 01:01:12 to 01:01:51 followed by a sentence from 01:01:59 to 01:02:21. In accordance with the embodiments discussed herein, if the media guidance application pauses the debate at 01:02:01 (i.e., in the middle of Linda's second sentence during the debate), the media guidance application may resume the debate scene for the user, based on receiving the user's input, from the start of Linda's line at 01:01:12.

In some embodiments, the above-used threshold time period is a first threshold time period, and the metadata comprises a plurality of additional time stamps corresponding to starting times of a plurality of sentences of the media asset. In some embodiments, the media guidance application may further determine whether the time period between the first time and the second time is not greater than the first threshold time period and is greater than a second threshold time period. In response to determining that the time period is not greater than the first threshold time period and is greater than the second threshold time period, the media guidance application may analyze the metadata to determine that the first position is in-between a start and an end of a recent sentence, and generate the media asset for display at the start of the recent sentence. For example, in addition to the original threshold time period of "30 minutes" configured by the user, the media guidance application may receive a further input from the user to configure a second threshold time period of "5 minutes." Based on these two thresholds, the media guidance application may determine that the time period between the user instruction to pause the program and the user instruction to resume the program (e.g., 12 minutes) is greater than the second threshold (i.e., "5 minutes") but is not greater than the first threshold (i.e., "30 minutes"). In response to this determination, the media guidance application may further determine that the paused position (at "01:02:01") is in the middle of a sentence, and resume the on-demand program for the user from the start of the sentence (i.e., "01:01:59") rather than from the start of the scene (i.e., "01:00:52").

In some embodiments, the media guidance application may analyze the metadata to determine that the first position is in-between the start and the end of the recent sentence by updating the playback hierarchy with the plurality of additional time stamps and the plurality of sentences, determining the start of the recent sentence of the media asset from the playback hierarchy based on the first position, setting the start of the recent sentence as a third position of the media asset, and generating the media asset for display beginning at the third position preceding the first position. For example, in order to determine that the paused first position is in-between the start and end of a recent sentence, the media guidance application may update the playback hierarchy with a plurality of time stamps corresponding to a plurality of sentences in the on-demand program, such that the playback hierarchy for the program contains not only scene-level and character-level time stamps, but also sentence-level time stamps. Once the media guidance application determines that the first position ("01:02:01") is in-between the start ("01:01:59") and end ("01:02:21") of Linda's second sentence in the debate scene, the media guidance application may set the time stamp for the start of the sentence as the third position of the program and resume the program from the third position ("01:01:59") preceding the first position ("01:02:01").

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an illustrative example of a data structure for metadata as used by a media guidance application in accordance with some embodiments of the disclosure;

DETAILED DESCRIPTION

Systems and methods are described to address shortcomings in conventional media systems by resuming a media asset from a logical point for the user. The systems and methods may be implemented via a media guidance application running on a user device (e.g., user equipment device 700 (FIG. 7)), a remote server (e.g., media content source 816 or media guidance data source 818 (FIG. 8)), or another suitable device.

Figure 1:
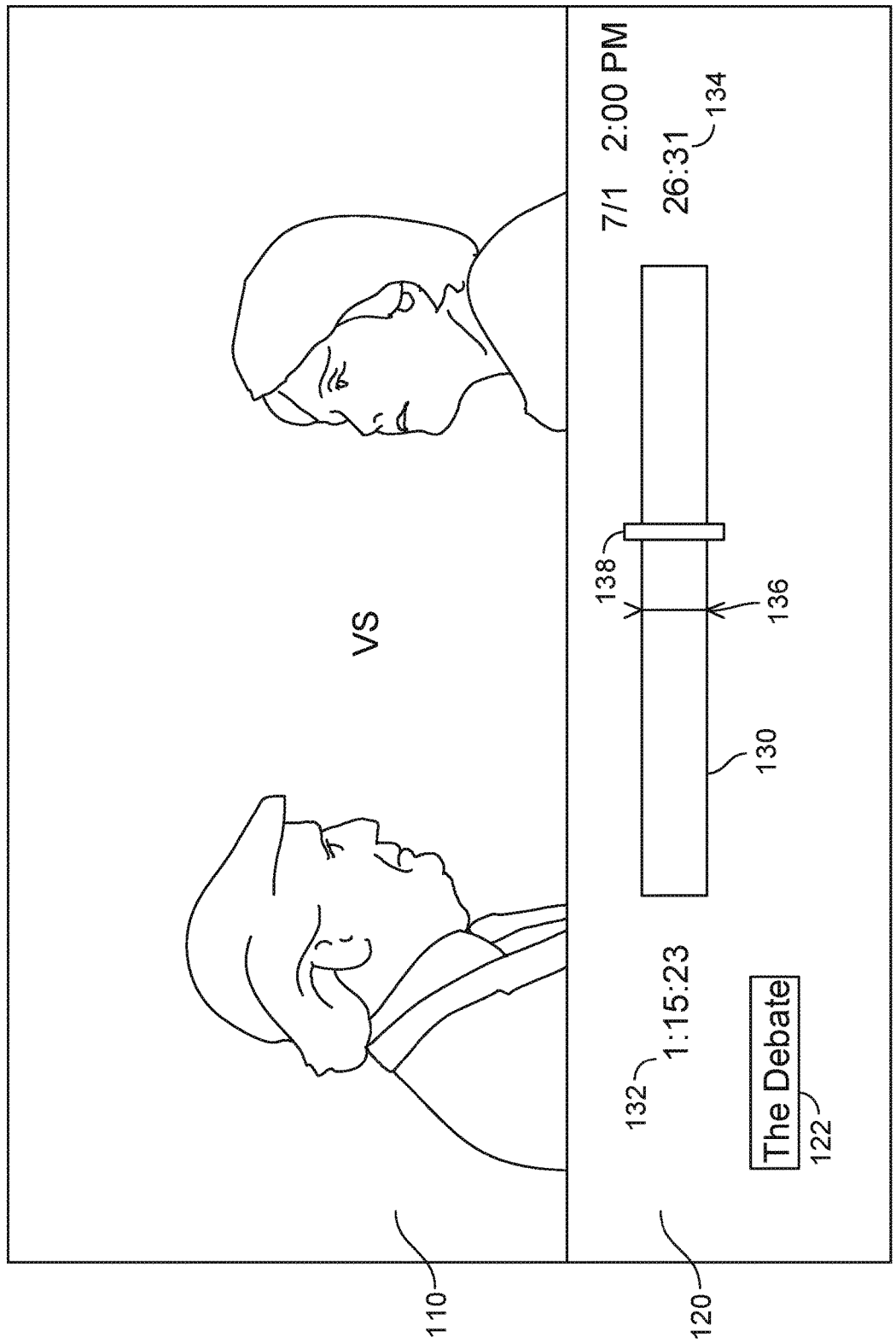
FIG. 1 shows an illustrative example of a display screen generated by a media guidance application in accordance with some embodiments of the disclosure.

FIG. 1 shows an illustrative example of a display screen generated by a media guidance application in accordance with some embodiments of the disclosure. On display screen 100 of FIG. 1, the media guidance application may receive a video stream and generate it for display as video frame 110 on a display device, such as display 712 of FIG. 7. The media guidance application may also receive metadata associated with the video stream and display it as information panel 120 on the display device. Although information panel 120 is shown as a banner overlay on display screen 100, it is understood by one skilled in the art that other forms of displaying metadata information is contemplated by this disclosure, for example, by displaying such metadata as a side bar. Within information panel, the media guidance application may generate for display an optional media asset identifier 122, as well as a progress bar 130. Progress bar 130 is marked by time elapsed 132 and time remaining 134, which indicate the amount of the video that the user has watched and the remaining amount that the user has yet to watch, respectively. Optionally, the media guidance application may generate for display a progress indicator 138 on progress bar 130.

In some embodiments, once a user has paused a media asset, the media guidance application automatically analyzes the paused position of the media asset (as indicated by progress indicator 138) to determine if it is in the middle of a sentence. In some embodiments, the determination may be based on metadata associated with the media asset that outlines the time stamps for each and every sentence in the media asset. Once the media guidance application compares the paused position, at progress indicator 138, against the time stamps, the media guidance application may determine it is in the middle of a sentence if the paused position is in-between a starting time stamp and an ending time stamp for a sentence. In some other embodiments, the media guidance application may rely on speech recognition and/or natural language processing (NLP) rules to determine whether the user paused in the middle of a sentence. For example, the media guidance application may perform NLP on the audio stream of the media asset up to the paused position, and determine if the sentence corresponding to the paused position (at progress indicator 138) is complete. If the sentence is incomplete according to one or more grammar rules, the media guidance application may determine that the paused position is in the middle of a sentence. One possible grammar rule for making this determination is to analyze the subject-verb-object (SVO) structure of the sentence and determine if one or more elements is missing. In still some further embodiments, the media guidance application may use a combination of metadata and NLP rules to make this determination. In still some other embodiments, the media guidance application may determine whether the user paused in the middle of a sentence by analyzing the audio stream associated with the media asset and determining if a character is talking. For example, the media guidance application may apply a simple speech recognition algorithm to determine if the on-demand program is outputting a human voice, as compared to pure background music or silence (e.g., white noise), when the user paused the program. In the event that the program is outputting human voice, the media guidance application may determine that the user has paused in the middle of a sentence for the program.

In some embodiments, once the media guidance application has determined that the paused position of the media asset is in the middle of a sentence, the media guidance application may determine a position within the media asset that corresponds to the start of the paused sentence, as represented by position bookmark 136 in display screen 100 of FIG. 1. In some embodiments, position bookmark 136 is generated for display to the user on progress bar 130, and may optionally be updated in real time as the video progresses. For example, as the user progresses through an on-demand program (as represented by progress indicator 138), the media guidance application may generate position bookmark 136 for display as a shifting marker that trails progress indicator 138. In some other embodiments, position bookmark 136 merely represents information that is kept by the media guidance application and is not generated for display to the user. The time stamp information saved in position bookmark 136 may, however, be constantly updated to reflect the start of the most recent sentence. In some embodiments, the media guidance application may store the position of progress indicator 138 within position bookmark 136 and refrain from generating progress indicator 138 for display. In such embodiments, the media guidance application may constantly update position bookmark 136 to include future positions of progress indicator 138, or to override the existing position of progress indicator 138 with the future positions of progress indicator 138.

The determination of the start of the paused sentence may be based on the metadata associated with the media asset, speech recognition using NLP rules, or a combination of the two. Once the media guidance application has determined where the start of the sentence is, it may receive a subsequent user instruction to resume the media asset. Instead of resuming the media asset from where it was paused, the media guidance application may automatically resume from the start of the sentence, as indicated by position bookmark 136, thereby allowing the user to recall more easily what he was watching by having a buffer period to for him to adjust.

Figure 2:
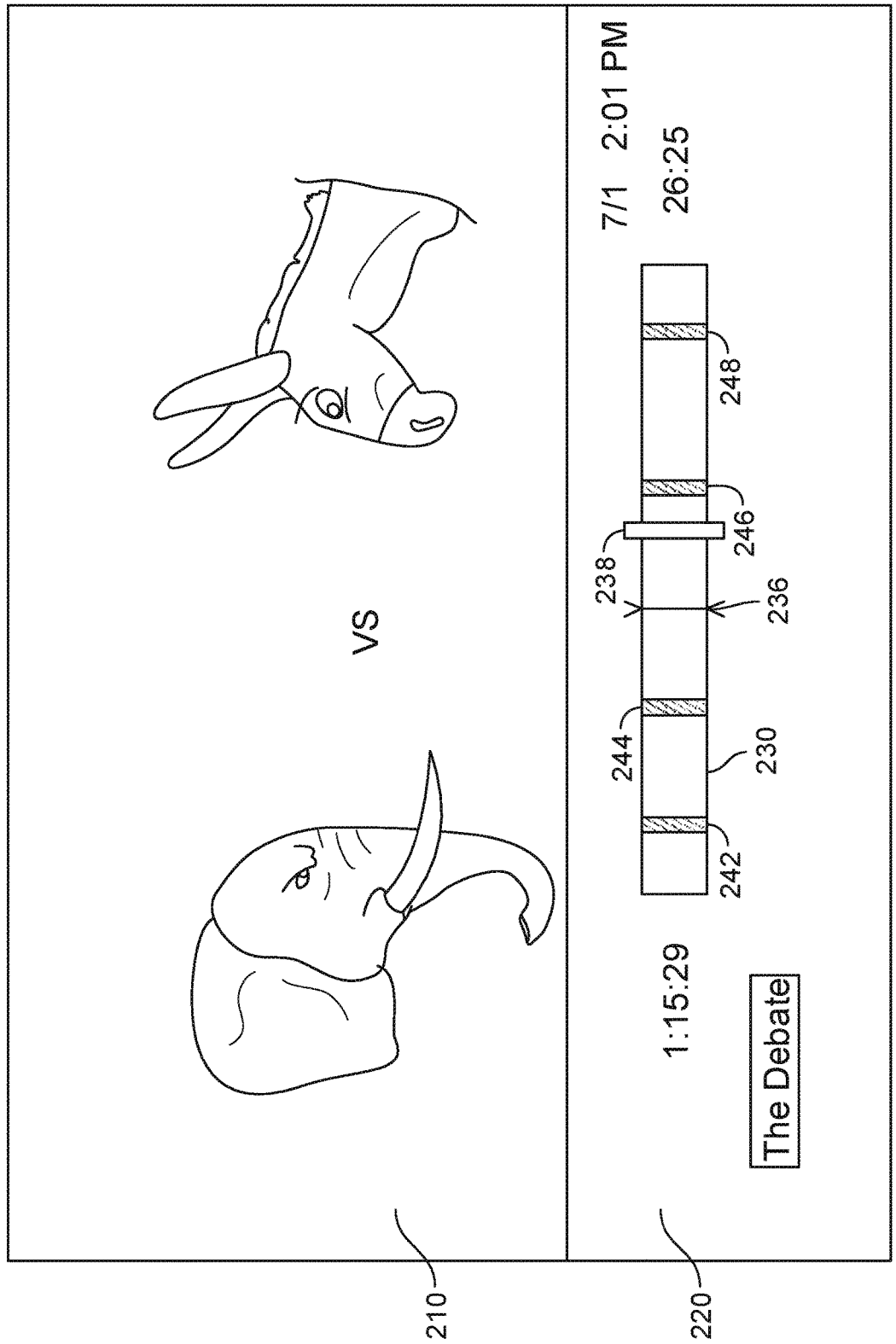
FIG. 2 shows another illustrative embodiment of a display screen generated by a media guidance application in accordance with some embodiments of the disclosure.

FIG. 2 shows another illustrative embodiment of a display screen generated by a media guidance application in accordance with some embodiments of the disclosure. On display screen 200 of FIG. 2, the media guidance application may generate video frame 210 and information panel 220 in a substantially similar manner as video frame 110 and information panel 110 of FIG. 1. Within progress bar 230, the media guidance application may generate a plurality of scene indicators 242, 244, 246, and 248, in addition to progress indicator 238 and optionally position bookmark 236. The plurality of scene indicators may correspond to starting points of a plurality of scenes, or chapters, such as different topic segments of a Presidential Debate. In an illustrative example, the Presidential Debate as shown in video frame 210 may be divided into six topic segments for a total of 90 minutes. Therefore, the media guidance application may generate the scene indicators at the start of each scene, e.g., at 00:05:31, 00:29:15, 01:00:52 . . . on progress bar 230. Exemplary scene structures are shown in scene-level time stamp table 410 of FIG. 4. In some embodiments, the scene indicators may correspond to ending time stamps of commercial breaks. For example, each segment of video (or scene) of the debate program may start at the end of a commercial break.

FIG. 3 shows an illustrative example of a data structure for metadata as used by a media guidance application in accordance with some embodiments of the disclosure. In FIG. 3, the data structure is presented in a markup language format similar to XML, but it is understood by a skilled person in the art that the exact format and data structure used herein is non-limiting, and merely serves to illustrate the concept of metadata. In some embodiments, information panel 120 and 220 may each incorporate data from the metadata of FIG. 3. For example, media asset identifier 122 may be displayed based on data stored at the "name" field in the metadata (e.g., the "name" field in row 1). Additional elements such as scene indicators 242, 244, 246, and 248 may be based on data stored at the "time" field for each segment of the metadata, such as the "time" fields of rows 6, 12, and 17. In some embodiments, the metadata may include data associated with the media asset that is not yet generated for display on a display screen. For example, the URL data stored at the "social_media" field in row 8 may not be displayed explicitly in information panel 120, but may be accessible as a hyperlink when the user clicks on information panel 120 when progress indicator 138 indicates that the user is currently watching the first segment, in order to provide the user with real-time access to social networks to participate in discussing the issues raised in the media asset.

In some embodiments, in addition to determining if the media asset is paused in the middle of a sentence, the media guidance application may determine, instead, whether the media asset is paused in the middle of a plot line, a scene, or a particular character or a speaker's unfinished line. In some embodiments, the media guidance application may implement a playback hierarchy, such as playback hierarchy 400 of FIG. 4 as included in the metadata of FIG. 3, to make this determination.

Figure 4:
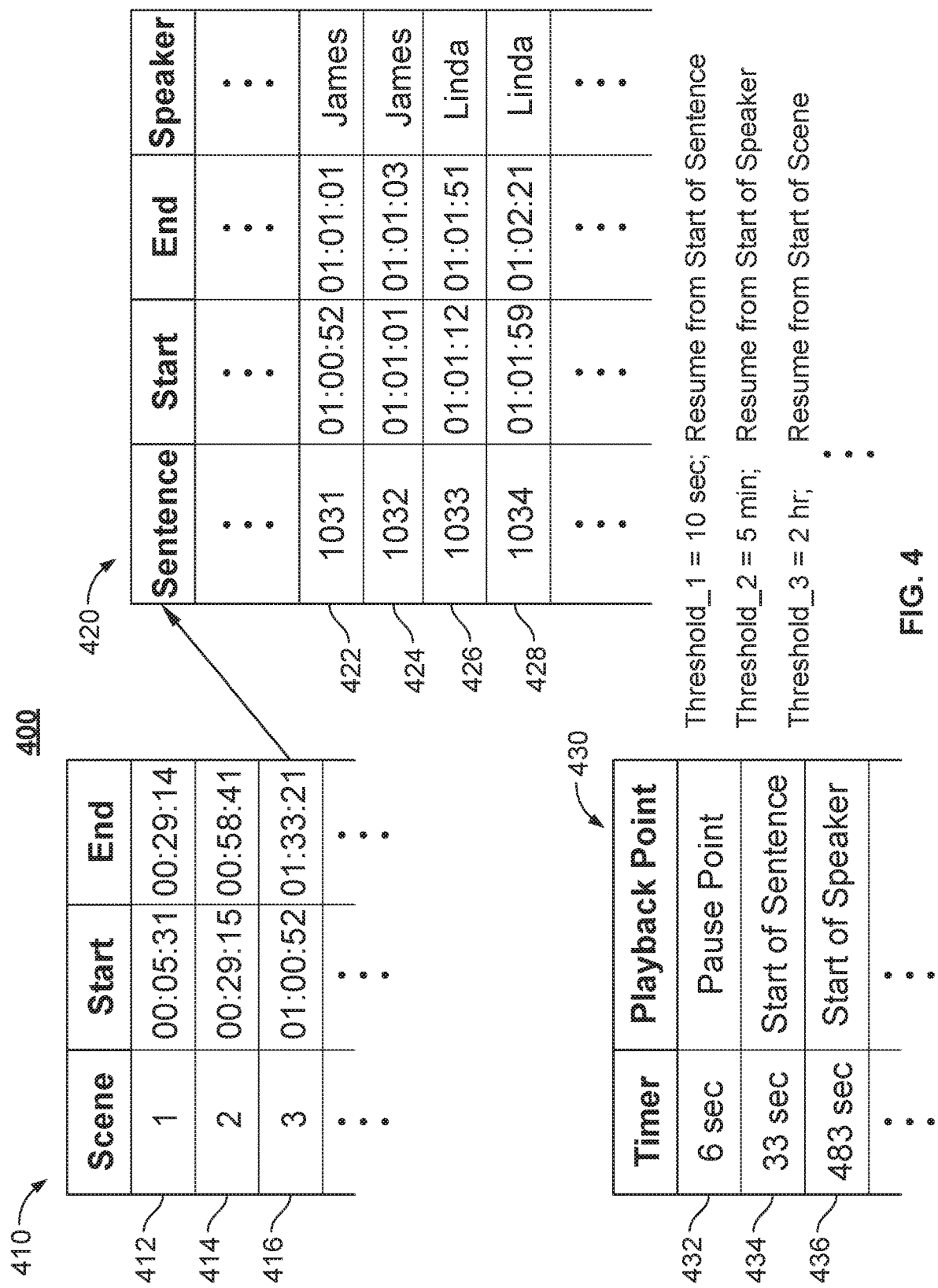
FIG. 4 shows an illustrative example of a playback hierarchy as used by a media guidance application in accordance with some embodiments of the disclosure.

FIG. 4 shows an illustrative example of a playback hierarchy as used by a media guidance application in accordance with some embodiments of the disclosure. Playback hierarch 400 may include scene-level table 410 and sentence-or-character-level table 420. In some embodiments, the media guidance application may further store a copy of timer table 430 within playback hierarchy 400, in order to keep track of how long a user has paused a media asset for and the corresponding playback point to resume the media asset from based on the settings that the user has previously entered. In some other embodiments, the media guidance application may store timer table 430 in a storage unit, such as storage 708 of FIG. 7, independently from tables 410 and 420.

In some embodiments, playback hierarchy 400 contains time stamps for scene-level progress in scene-level table 410. In some other embodiments, playback hierarchy 400 contains time stamps for sentence-level or character-level progress in sentence-or-character-level table 420. For example, the playback hierarchy may contain time stamps for every plot line, scene change, character movements, speaker lines, and sentences in the media asset. Of course, the playback hierarchy could also include a subset of the above-listed information, or any other playback information associated with the media asset. In some embodiments, playback hierarchy 400 may be included in the metadata of the media asset, such that the media guidance application receives the playback hierarchy along with the metadata from a remote server, such as media guidance data source 818 or media content source 816.

Scene-level table 410 may include a number of rows corresponding to the scenes or chapters of a media asset. Sentence-or-chapter-level table 420 may include a number of rows corresponding to the sentences of the media asset, as well as the speaker for each sentence. In some embodiments, the sentence-level information and the character (or speaker)-level information may be split into two separate tables. With tables 410 and 420, the media guidance application may look up the starting and end times of each scene from rows 412, 414, and 416 and the starting and end times of each sentence, along with the speaker who recited the sentence, from rows 422, 424, 426, and 428. In some embodiments, the media guidance application may maintain a relationship between scene-level table 410 and sentenceor-character-level table 420, such as by placing the tables in a hierarchical fashion, so that the sentences within a scene can be easily looked up. For example, the media guidance application may look up a hypothetical time stamp ("01:02:01") from within tables 410 and 420, and determine that the hypothetical time stamp happens in row 416, at scene 3. From row 416, the media guidance application may be linked to a lower layer of playback hierarchy 400, where sentence-or-character-level table 420 can be accessed, and determines that the hypothetical time stamp ("01:02:01") further corresponds to row 428, at sentence 1034, which is recited by "Linda."

With playback hierarchy 400, the media guidance application may resume the media asset after receiving a user input to do so, by generating the media asset for display from the beginning of the cut-off scene, the beginning of the cut-off line of a particular speaker, the most recent change of speaker, and so on. In some embodiments, scene-level table 410 indicates the beginning and the end of each scene, whereas sentence-or-character-level table 420 may include the beginning and the end of each sentence, as well as information on change of speakers. For example, the media guidance application may determine that Linda is completing her last sentence in row 428 in a debate with James when it receives an input from the user to pause the on-demand program. Upon receiving a further user input to resume the paused on-demand program, the media guidance application may resume from the beginning of Linda's cut-off sentence (e.g., from 01:01:59 as shown in row 428), the beginning of the very first sentence that Linda speaks in this round of exchange (e.g., from 01:01:12 as shown in row 426), the beginning of the debate scene (e.g., from 01:00:52 as shown in row 416), or any of a number of different starting points, in order to give the user a reminder of the on-demand program's context and resume from a logical point for the user.

In some embodiments, the media guidance application may determine what a logical starting point for a particular user's specific circumstances is by keeping track of how long the user has been away for using timer table 430. For each time entry listed under the "Timer" column of timer table 430, the media guidance application may compare against one or more threshold time periods, such as threshold_1, threshold_2, and threshold_3 in order to determine a corresponding playback point. If the time entry does not exceed the first threshold ("Threshold_1"), the media guidance application may determine that the media asset should be resumed from the pause point, i.e., the position where the media asset is paused. If the time entry exceeds the first threshold but does not exceed the second threshold ("Threshold_2"), the media guidance application may determine that the media asset should be resumed from the start of the recent sentence. Subsequent comparisons against the threshold time periods may cause the media guidance application to resume the media asset from the start of a current speaker's line, the start of a recent scene, the start of a recent chapter, etc. as discussed above.

For example, if the user has only been away for a few seconds, as indicated by row 432, the media guidance application may simply resume from the same point as the paused position of the media asset, because the user may still have vivid memory of where he left off. The media guidance application may make this determination by consulting the threshold settings previously entered by the user. In this example, the user has previously entered 10 seconds as threshold_1, which indicates that the media guidance application should resume the paused media asset from the position where it was paused (i.e., the "pause point") if the user has been away for less than threshold_1 amount of time (as reflected by the amount of time that the media asset is paused for). As another example, if the media guidance application determines that the user has been away for 33 seconds, as shown in row 434, the media guidance application may determine that the media asset has been paused for a time period that exceeds threshold_1 but does not exceed threshold_2. According to row 434, the media guidance application may resume the media asset from further back, such as from the beginning of the sentence. In a further example, if the media guidance application determines that the user has been away for an even longer time, such as 483 seconds (or over 8 minutes) as shown in row 436, the media guidance application may further compare against threshold_2 and threshold_3, and resume the media asset from the beginning of the current speaker's line. Further examples can be envisioned, whereby if the user has been away for hours or days, the media guidance application may compare against further thresholds as previously configured by the user and resume the media asset from the beginning of a recent scene or even from the beginning of the media asset itself, in order to provide the user with more information and ensure a seamless viewing experience.

In some embodiments, the media guidance application may allow the user to customize the thresholds to decide how far back to resume a media asset as a function of his length of absence. For example, the media guidance application may receive user selection to resume the media asset from the same point as the paused position if the user has been away for less than ten seconds (as indicated by threshold_1 of FIG. 4), and resume the media asset from the start of the scene if he has been away for two hours or more (threshold_3 of FIG. 4). In some embodiments, the user customization of how far back to resume need not be configured as a function of his absence and can, instead, be an absolute time period. For example, the media guidance application may receive user input to configure his settings on these issues. According to the user's settings, the media guidance application may resume the media asset from a position that is 30 seconds before the paused position if he has been away for less than an hour, and resume from a point that is 5 minutes before the paused position if he has been away for longer than half a day, etc. In some embodiments, the media guidance application may perform a temporal "snap-in" when resuming the media asset from a fixed time period before the paused position in order to avoid starting from the middle of a sentence. For example, if the media guidance application resumed a paused on-demand program from the point that is 5 minutes before the paused position, based on the user's settings, and the point happens to cut into the middle of a sentence (or the middle of a particular character's line, etc.), the media guidance application may go back a little further to the beginning of the sentence (or the beginning of the line, etc.) to produce a logical starting point, despite the user's configuration of going back by 5 minutes only.

In some embodiments, the media guidance application may receive the user's input to pause the media asset from a first device, and receive the user's input to resume the media asset from a second device. For example, the media guidance application may determine that a user has watched the on-demand program for 30 minutes on a television before pausing it, and, subsequently, turned on his cell phone to resume watching the same on-demand program. In some embodiments, the media guidance application may perform the same methods as described above, by resuming the media asset for the user, on the second device, from a position before the paused position on the first device depending on how long the user has been away for.

In some embodiments, after receiving the user's input to pause a media asset, the media guidance application may monitor the user's subsequent viewing of the same media asset to determine how far back to resume. For example, the media guidance application may determine that the user first began watching the on-demand program on a television and paused after 30 minutes, resumed the on-demand program a few hours later on a cell phone and paused again after 20 minutes, and finally resumed the on-demand program two days later on the television again. In this example, the media guidance application may take into account the user's viewing of the on-demand program on the cell phone in calculating how far back to resume the on-demand program on the television. The time period that the user has been away for from the last time he accessed watched the on-demand program (i.e., from the cell phone) will be used to determine how far back to resume the on-demand program on the television. In some other embodiments, the total amount of time that the user has been away for from the first device may alternatively be used by the media guidance application to determine how far back to resume the on-demand program.

In some embodiments, the illustrative data structure of FIG. 3 corresponds to the metadata as transmitted or received in-between devices, whereas the illustrative playback hierarchy shows a data structure for storing and modifying at least a portion of the received metadata. For example, the markup language document of FIG. 3 may correspond to a data file containing the metadata associated with the debate program that is transmitted from a remote server, such as media guidance data source 818 of FIG. 8, to the user equipment. The media guidance application implemented on the user equipment may subsequently parse the data file into the playback hierarchy of FIG. 4 and store the playback hierarchy in storage 708 for reference at a later time.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

As referred to herein, an "interactive media guidance application," or a "media guidance application" or, sometimes, a "guidance application." is an application that allows a user to consume and/or navigate to content. In some embodiments, the media guidance application may be provided as an online application (i.e., provided on a website), or as a stand-alone application on a server or a user device. In some embodiments, control circuitry installed on various devices and platforms may execute the media guidance application, as described in more detail below. In some embodiments, the media guidance application and/or any instructions for performing any of the embodiments discussed herein may be encoded on machine-readable media. Machine-readable media includes any media capable of storing data. The machine-readable media may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, media card, register memory, processor caches, Random Access Memory ("RAM").

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on machine-readable media. Machine-readable media includes any media capable of storing data. The machine-readable media may be transitory, including, but not limited to, propagating electrical or electromagnetic signals, or may be non-transitory, including, but not limited to, volatile and non-volatile computer memory or storage devices such as a hard disk, floppy disk. USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/IV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
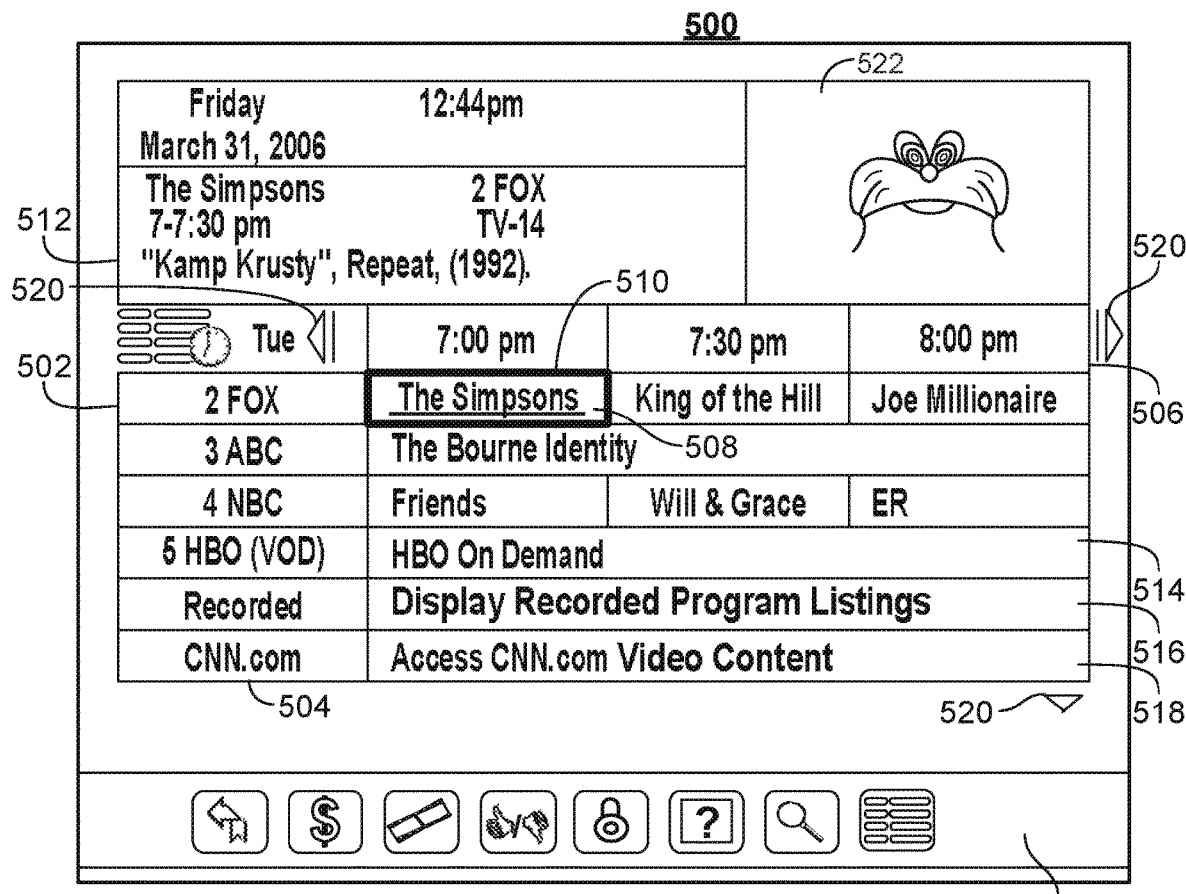
FIG. 5 shows yet another illustrative example of a display screen generated by a media guidance application in accordance with some embodiments of the disclosure.
Figure 6:
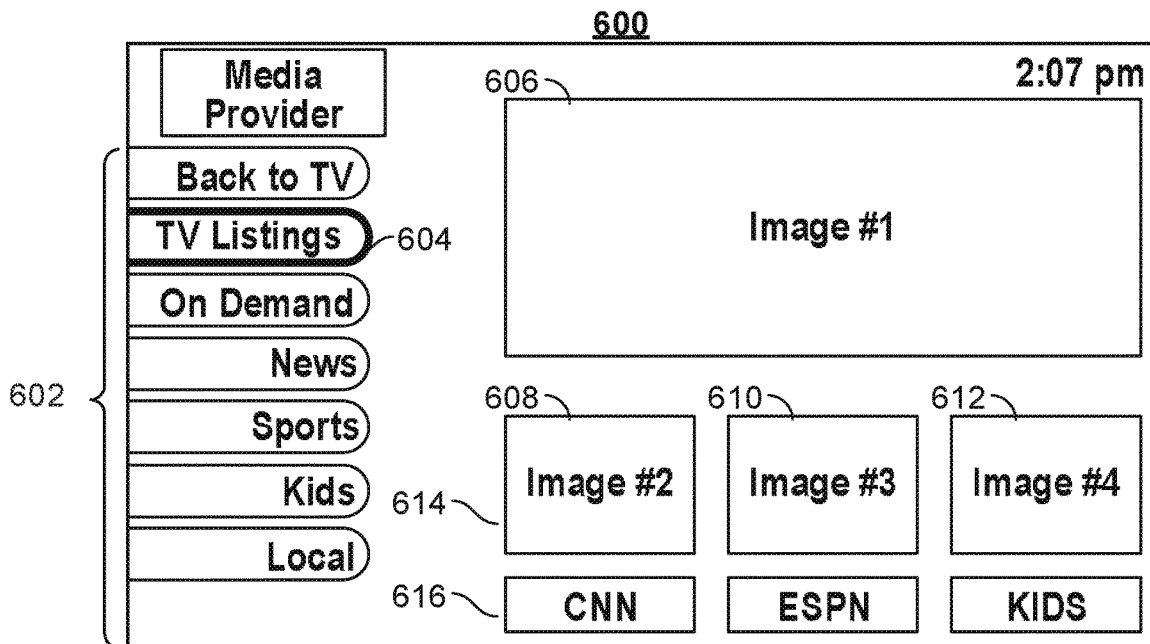
FIG. 6 shows yet another illustrative example of a display screen generated by a media guidance application in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
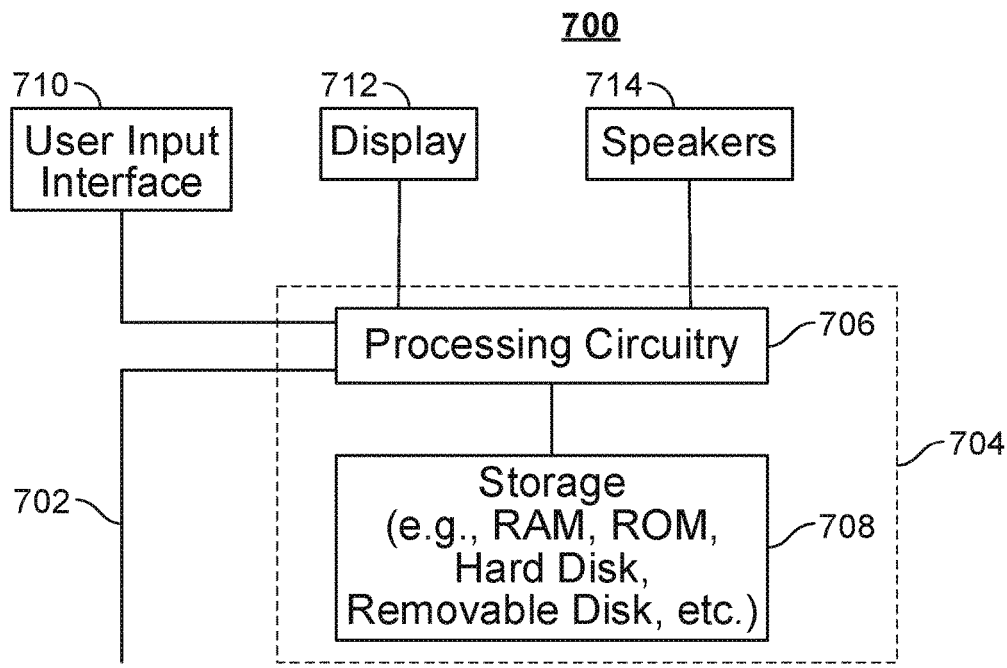
FIG. 7 is a block diagram of an illustrative user equipment device in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using V/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708).

Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
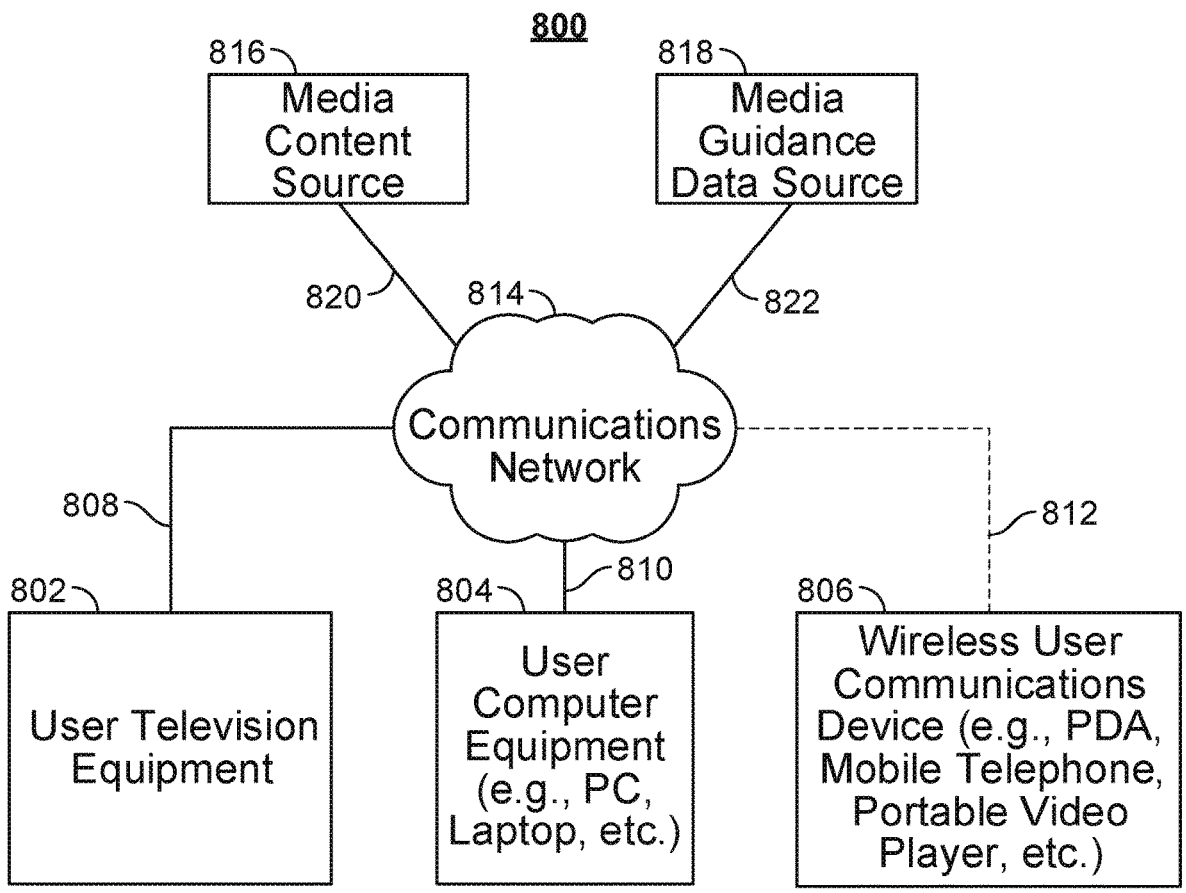
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables. IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third-party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu. LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices.

These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
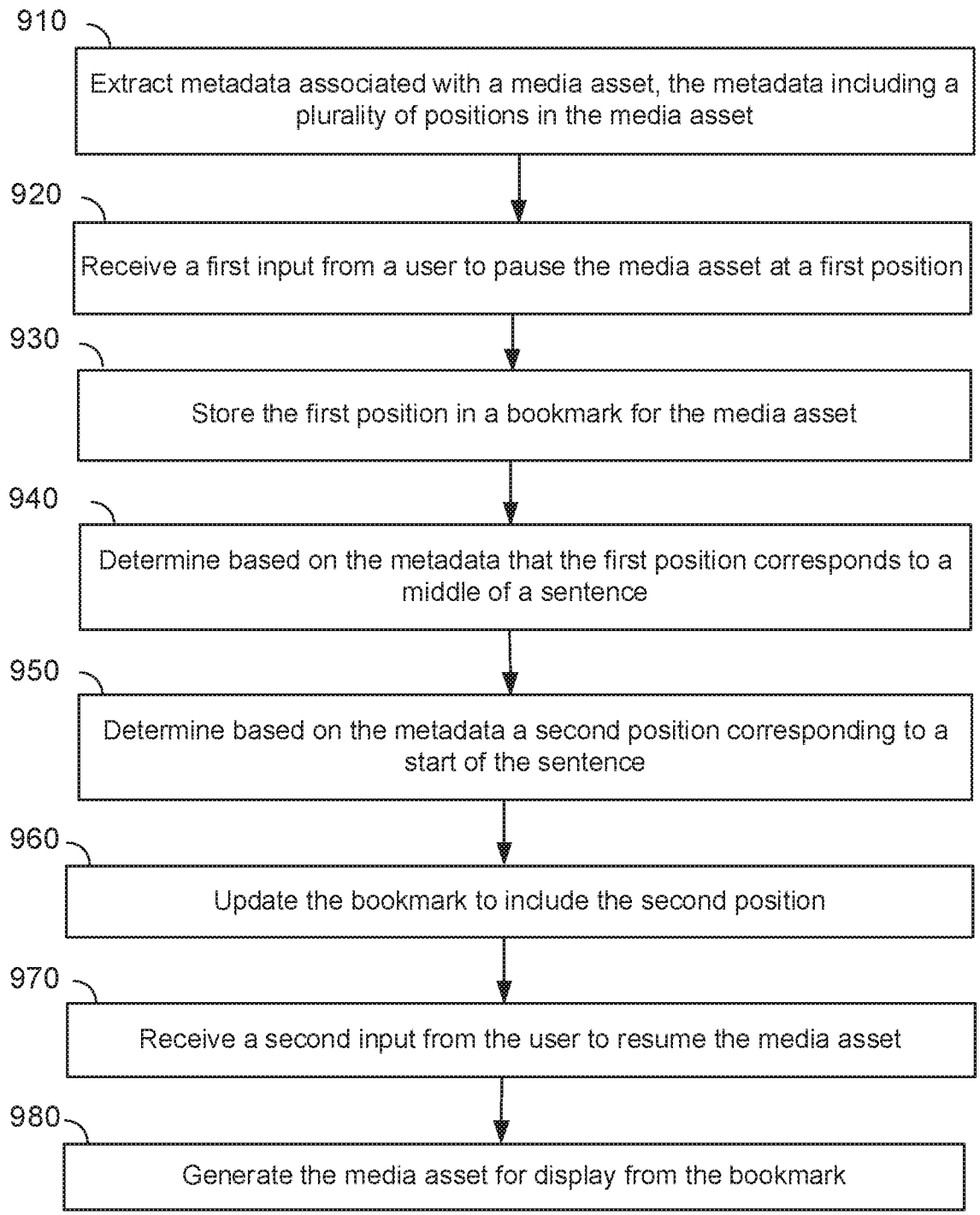
FIG. 9 is a flowchart of an illustrative process for resuming a media asset using a media guidance application in accordance with some embodiments of the disclosure.

FIG. 9 is a flowchart of an illustrative process 900 for control circuitry (e.g., control circuitry 704 of FIG. 7) to resume a media asset using a media guidance application in accordance with some embodiments of the disclosure. In some embodiments, this algorithm may be encoded onto a non-transitory storage medium (e.g., storage device 708) as a set of instructions to be decoded and executed by processing circuitry (e.g., processing circuitry 706). Processing circuitry 706 may, in turn, provide instructions to other sub-circuits contained within control circuitry 704, such as the tuning, video generating, encoding, decoding, encrypting, decrypting, scaling, analog/digital conversion circuitry, and the like.

At 910, a media guidance application may cause control circuitry 704 to extract metadata associated with the media asset, whereby the metadata includes a plurality of positions in the media asset. For example, the media guidance application may receive an on-demand program on the first presidential debate of the year when a user selects the program for display. The media guidance application may receive the on-demand program from a remote server, such as media content source 816 via path 820, along with the metadata associated with on-demand program. In this embodiment, the media guidance application may receive the on-demand program from media content source 816 and receive the metadata separately from media guidance data source 818 via path 822, and match the metadata with the on-demand program locally at the user equipment. In either scenario, the media guidance application may extract metadata associated with the on-demand Presidential Debate, which contains six segments of videos lasting for a total of 90 minutes. The metadata in this example may include, among other things, time stamps corresponding to the start time and end time for each segment, for each candidate's response, and for each sentence. For consistency, we assume that the on-demand program as used in this example runs from 00:00:00 to 01:30:00.

At 920, the media guidance application may cause control circuitry 704 to receive a first input from a user to pause the media asset at a first position of the plurality of positions. The first input from the user may be received via user input interface 710 and processed by processing circuitry 706 of control circuitry 704. For example, the media guidance application may receive an input from a user to pause the on-demand Presidential Debate program at 01:02:01, which is a time stamp among a plurality of time stamps. The time stamp 01:02:01 may also be referred to as a first "position" of the on-demand program, and may indicate the progress the user has made in the on-demand program. In the above example, the user has watched 32 minutes and 15 seconds of the on-demand program. In this embodiment, the plurality of time stamps as stored in the metadata may be all the time stamps that are available from the metadata associated with the media asset, that is, each and every time stamp within the range of 00:00:00 and 01:30:00. For example, the metadata may contain time stamps 00:00:01, 00:00:02 . . . 01:29:59, and 01:30:00.

At 930, based on receiving the first input from the user, the media guidance application may cause control circuitry 704 to store the first position in a bookmark for the media asset. For example, based on receiving the first input from the user to pause the on-demand program at 01:02:01, the media guidance application may store the first position (i.e., "01:02:01") in the bookmark. In this embodiment, the bookmark may be stored locally at the user equipment, such as in storage 708 of user computer equipment 804. In some other embodiments, the first position of the program may be transmitted from the user equipment to a remote server, where it may be stored in a bookmark in the cloud.

At 940, the media guidance application may cause control circuitry 704 to determine that the first position in the media asset corresponds to a middle of a sentence based on the metadata; For example, the media guidance application may determine that the first position corresponds to the middle of a sentence based on the metadata, which, as described above, contains the start and end times of each sentence in the on-demand program. In this particular example, the media guidance application may determine from the metadata that a sentence being spoken by one of the speakers runs from 01:01:59 to 01:02:21, such as the sentence shown in row 428 of the metadata presented in FIG. 4. In this embodiment, the media guidance application may cause control circuitry 704 to make the determination that the first position corresponds to the middle of the sentence by determining, based on the metadata, a second position and a third position of the plurality of positions in the media asset corresponding to a start and an end of the sentence, respectively. For example, the media guidance application may determine that the paused sentence at the first position ("01:02:01") has a second position corresponding to the start of the sentence at 01:01:59, and a third position corresponding to the end of the sentence at 01:02:21. The media guidance application may further compare the first position against the second and the third positions to determine that the first position is before the third position and is after the second position. Continuing from the above examples, the media guidance application may compare the first position ("01:02:01") against the second ("01:01:59") and third ("01:02:21") positions to determine that the first position is before the third position and is after the second position. Based on this, the media guidance application is able to determine that the paused position cuts a sentence in the middle.

At 950, the media guidance application may cause control circuitry 704 to determine a second position of the plurality of positions in the media asset corresponding to a start of the sentence based on the metadata.

At 960, the media guidance application may cause control circuitry to update the bookmark to include the second position. For example, based on the metadata as shown in FIG. 4, the media guidance application may determine that the start of the paused sentence is at 01:01:59, as discussed above; and update the bookmark from the first position ("01:02:01") to the second position ("01:01:59"). In this embodiment, the media guidance application may cause control circuitry 704 to update the bookmark to include the second position by removing the first position from the bookmark for the media asset; and inserting the second position in the bookmark. For example, the media guidance application may update the bookmark by removing the first position ("01:02:01") from the bookmark and inserting the second position ("01:01:59") into the bookmark. Alternatively, the media guidance application may cause control circuitry 704 to update the bookmark by simply adding the second position in addition to the first position.

At 970, the media guidance application may cause control circuitry 704 to receive a second input from the user to resume the media asset. For example, the media guidance application may cause processing circuitry 706 to determine from user input interface 710 the user instruction to resume the media asset. In this embodiment, based on receiving the second input from the user, at 980, the media guidance application may cause control circuitry to generate the media asset for display from the bookmark. For example, the media guidance application may receive the second input from the user a few minutes after receiving the first input to pause the program, in order to resume the on-demand program. Based on receiving the second input, the media guidance application may generate the program for display from the bookmarked second position ("01:01:59") that corresponds to the beginning of the sentence that was cut off by the pause.

Figure 10:
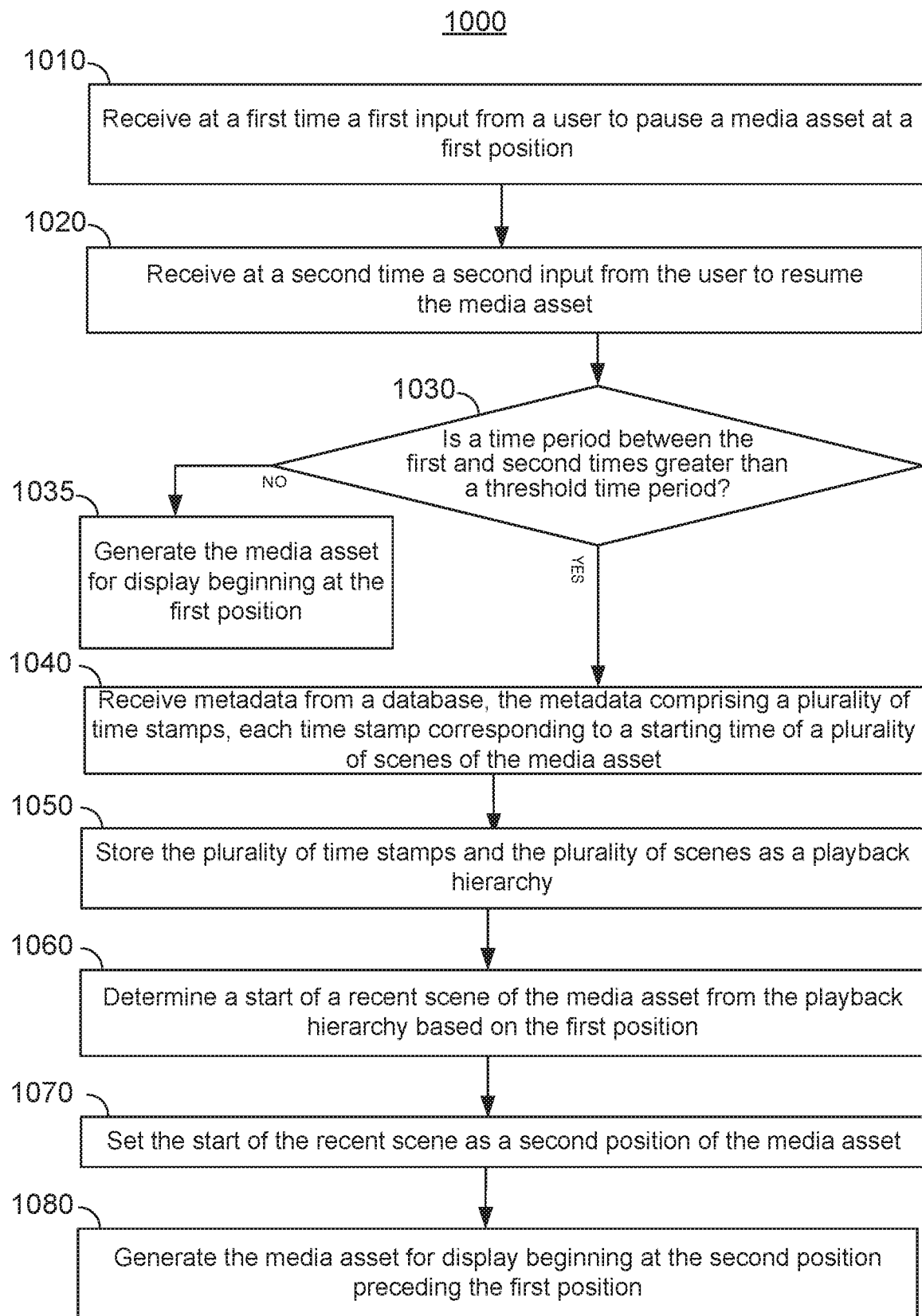
FIG. 10 is a flowchart of another illustrative process for resuming a media asset using a media guidance application in accordance with some embodiments of the disclosure.

FIG. 10 is a flowchart of an illustrative process 1000 for control circuitry (e.g., control circuitry 704 of FIG. 7) to resume a media asset using a media guidance application in accordance with some embodiments of the disclosure. Some embodiments of this algorithm may be encoded onto a non-transitory storage medium (e.g., storage device 708) as a set of instructions to be decoded and executed by processing circuitry (e.g., processing circuitry 706). Processing circuitry 706 may, in turn, provide instructions to other sub-circuits contained within control circuitry 704, such as the tuning, video generating, encoding, decoding, encrypting, decrypting, scaling, analog/digital conversion circuitry, and the like.

At 1010, the media guidance application may cause control circuitry 704 to receive, at a first time, a first input from a user to pause a media asset at a first position. For example, the media guidance application may receive a first input to pause a recorded program at position 01:02:01, at 7:00 AM.

At 1020, the media guidance application may cause control circuitry 705 to receive, at second time, a second input from the user to resume the media asset. For example, the media guidance application may receive a second input to resume the recorded program at 8:00 AM. The media guidance application may cause control circuitry 705 to monitor user inputs at user input interface 710 with a constant loop in order to capture the first and second inputs, and additionally may implement one or more trigger timers to record the time stamps associated with each input. In this embodiment, the media guidance application may cause control circuitry 704 to be responsive to interrupts from the trigger timers such that both the absolute time (e.g., 7:00 AM or 8:00 AM in the above example) as well as the relative progress as reflected by the position (e.g., the "01:02:01" in the above example) are monitored and recorded by the media guidance application.

At 1030, the media guidance application may cause control circuitry 704 to determine whether a time period between the first time and the second time is greater than a threshold time period. If the time period is not greater than the threshold time period, the media guidance application may cause control circuitry 704 to proceed to 1035. However, if the time period is greater than the threshold time period, the media guidance application may cause control circuitry 704 to proceed to 1040. For example, the media guidance application may determine the time period between 7:00 AM and 8:00 AM, i.e., one hour, is greater than a threshold time period (e.g., 30 minutes). The media guidance application may determine one or more threshold time periods based on user prior configuration. In this embodiment, the media guidance application may generate for display to the user a plurality of options, wherein each option of the plurality of options corresponds to a threshold time period. For example, the media guidance application may generate a plurality of threshold time periods as selectable options to the user, such as "5 minutes" "15 minutes", "30 minutes", and "one day" etc., each corresponding to a threshold time period that the user may select that designates how long the user is allowed to be absent for without resuming the media asset from an earlier position. For example, the media guidance application may receive a selection of "30 minutes" from the user, which designates that the user allowed to be absent for 30 minutes without having the media guidance application automatically resuming the program from an earlier position when the user selects to resume it. In other words, the user's selection of "30 minutes" as the threshold time period would cause the media guidance application to resume the program from an earlier position (e.g., start of scene, start of line, etc.) when the user has paused the program for longer than the threshold time period before resuming it. The user's selection of "15 minutes" as the threshold time period would similarly cause the media guidance application to resume the program from the paused position (not an earlier position) when the user has paused the program for less than the threshold time period before resuming it.

At 1035, in response to determining that the time period is not greater than the threshold time period, the media guidance application may cause control circuitry 704 to generate the media asset for display beginning at the first position.

At 1040, in response to determining that the time period is greater than the threshold time period, the media guidance application may cause control circuitry 704 to receive metadata from a database, wherein the metadata comprises a plurality of time stamps, each time stamp of the plurality of time stamps corresponding to a starting time of a plurality of scenes of the media asset. Continuing with the example above from this aspect of the disclosure, the media guidance application may, in response to determining that the one-hour time period is greater than the threshold time period of 30 minutes, receive metadata associated with the recorded program from a remote media content database, the metadata comprising time stamps corresponding to scenes within the recorded program. As discussed in another aspect of the present disclosure, the metadata associated with the media asset need not necessarily be received in response to determining the time period that the user is away for is greater than the threshold time period. Instead, the media guidance application may cause control circuitry 704 to receive the metadata from a plurality of sources at any time, at any fixed interval, or at the beginning of either process 900 or process 1000. For example, the media guidance application may receive the metadata associated with the on-demand debate program in response to receiving the user input to pause the on-demand program, resume the on-demand program, at the starting-up of the user equipment, or at the start of the program itself. As discussed herein, the media guidance application may cause control circuitry 704 to receive the metadata from a remote server, such as media guidance data source 818. Alternatively, the media guidance application may cause control circuitry 704 to receive the metadata from a local source, such as from local storage 708.

At 1050, the media guidance application may cause control circuitry 704 to store the plurality of time stamps and the plurality of scenes as a playback hierarchy. Continuing with the examples above, the media guidance application may, in response to determining that the one-hour time period is greater than the threshold time period of 30 minutes, receive metadata associated with the recorded program from a remote media content database, such as media guidance data source 818, the metadata comprising time stamps corresponding to scenes within the recorded program. The media guidance application may store the time stamps and the scenes of the recorded program as a playback hierarchy for the program. In this embodiment, the playback hierarchy may be substantially similar to playback hierarchy 400 of FIG. 4. In particular, a playback hierarchy that only contains time stamps and information related to "scenes" within a media asset may be substantially similar to scene-level table 410 of FIG. 4. In some further embodiments, the playback hierarchy may include additional layers of information that keep track of sentence-level and character-level data, among others. For example, the media guidance application may link scene-level table 410 of the playback hierarchy to sentence-or-character-level table 420 in order to build an extended playback hierarchy with additional functionalities, as will be discussed below.

At 1060, the media guidance application may cause control circuitry 704 to determine a start of a recent scene of the media asset from the playback hierarchy based on the first position.

At 1070, the media guidance application may cause control circuitry 704 to set the start of the recent scene as a second position of the media asset.

At 1080, the media guidance application may cause control circuitry 704 to generate the media asset for display beginning at the second position preceding the first position. For example, based on the first position where the recorded program is paused ("01:02:01"), the media guidance application may determine a start of the debate scene (i.e., "01:00:52") and set the start of the debate scene as the second position to resume the recorded program from. In this embodiment, the media guidance application may further cause control circuitry 704 to update a bookmark to include the second position. Details of the implementation of a bookmark in process 1000 are substantially similar to the bookmark implementation in process 900, as described in relation to FIG. 9 above. Thereafter, the media guidance application may generate the program for display from the beginning of the scene, as indicated by the second position that is preceding the first position.

Figure 11:
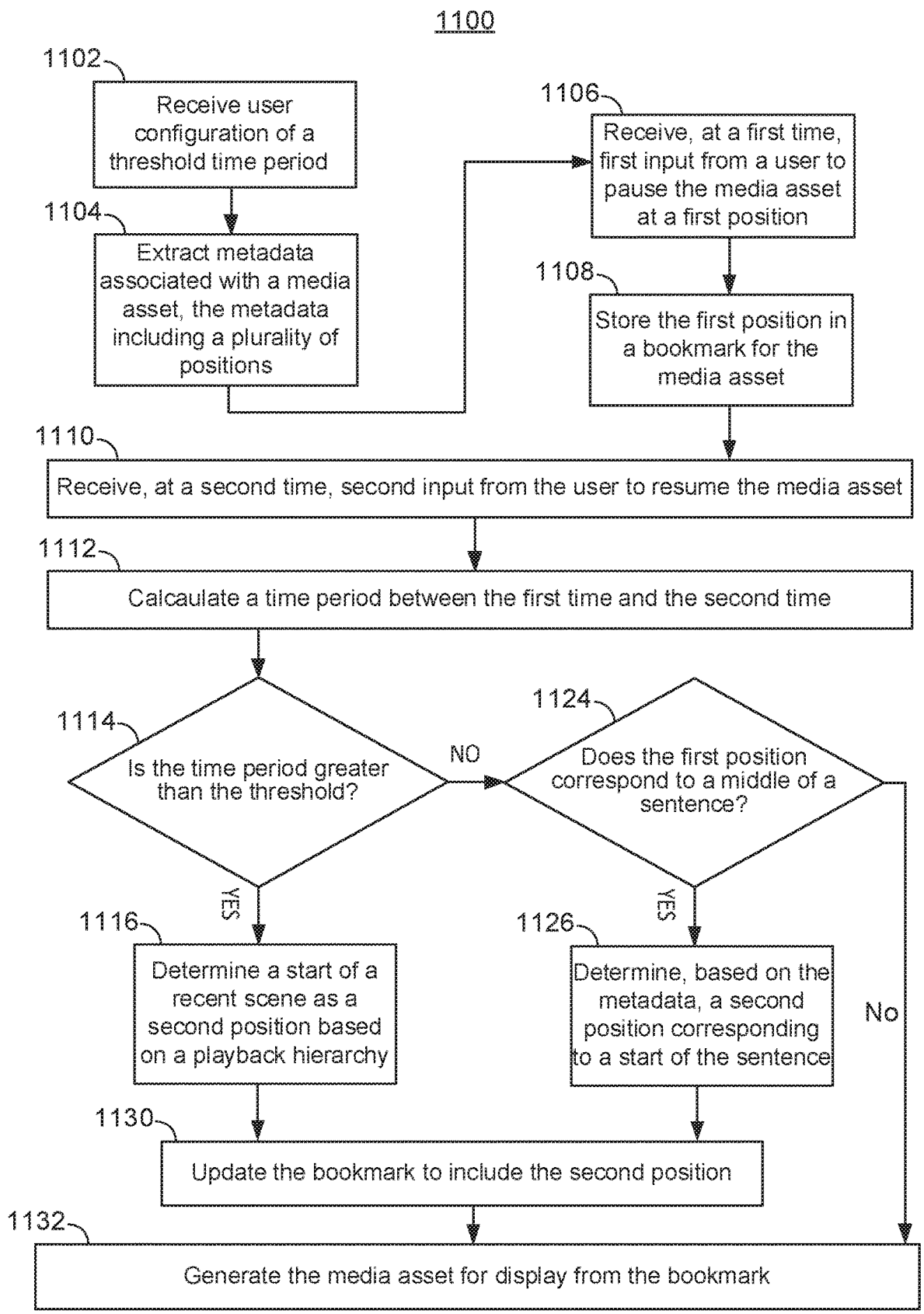
FIG. 11 is a flowchart of yet another illustrative process for resuming a media asset using a media guidance application in accordance with some embodiments of the disclosure.

FIG. 11 is a flowchart of an illustrative process 1100 for control circuitry (e.g., control circuitry 704 of FIG. 7) to resume a media asset using a media guidance application in accordance with some embodiments of the disclosure. Some embodiments of this algorithm may be encoded onto a non-transitory storage medium (e.g., storage device 708) as a set of instructions to be decoded and executed by processing circuitry (e.g., processing circuitry 706). Processing circuitry 706 may, in turn, provide instructions to other sub-circuits contained within control circuitry 704, such as the tuning, video generating, encoding, decoding, encrypting, decrypting, scaling, analog/digital conversion circuitry, and the like.

At 1102, the media guidance application may cause control circuitry 704 to receive user configuration of a threshold time period. For example, the media guidance application may receive a user configuration of one or more threshold time periods: "10 seconds", "5 minutes", and "2 hours", which may correspond to threshold_1, threshold_2, and threshold_3 of FIG. 4, respectively. In this embodiment, the media guidance application may receive the user configuration of threshold time periods by generating for display to the user a plurality of options, wherein each option of the plurality of options corresponds to a threshold time period. For example, the media guidance application may display a number of options each corresponding to a potential threshold time period for the user to select—"10 seconds", "5 minutes", and "2 hours" and let the user decide which options best suit his or her lifestyle. In this embodiment, the media guidance application may further generate a plurality of playback points for the user to relate to his or her selected threshold time periods. In this embodiment, the media guidance application may receive a user selection of a threshold time period and a playback point from the plurality of options, wherein the selections designate a corresponding threshold time period that the user is allowed to be absent for without resuming the media asset from the playback point. For example, the media guidance application may generate a list of options for playback points— "resume from beginning of the sentence", "resume from beginning of the current speaker's line", "resume from beginning of the scene", "resume from beginning of the program itself" . . . —for the user to match up with previous selections of threshold time periods, i.e., "10 seconds", "5 minutes", and "2 hours." In this way, the user may instruct the media guidance application to resume a paused program from the beginning of a sentence if the media guidance application detects the current program being paused for at least 10 seconds and not more than 5 minutes; and resume the paused program from the beginning of the current speaker's line if he or she has been away for at least 5 minutes but not more than 2 hours, etc. The media guidance application may also notify the user at a settings page that a selection of a particular time period as a threshold time period would cause the system to resume a paused on-demand program from an earlier position if the user has paused the program for longer than the threshold time period. The media guidance application may receive further user input in the settings page to configure other behaviors related to the pause-resume features.

At 1104, the media guidance application may cause control circuitry 704 to extract metadata associated with a media asset, the metadata including a plurality of positions. Exemplary data structures for the metadata are shown in FIGS. 3 and 4, and may be transmitted, stored, or presented in any format and data structure suitable for a particular application as described herein. In this embodiment, the metadata associated with the media asset may include caption text, and the media guidance application may analyze the caption text to determine the relative locations of sentences, scenes, and characters' lines in a media asset. In this embodiment, the metadata associated with the media asset includes a field for a current speaker of the media asset and an indication of a start of the current speaker's line. For example, as shown in row 422 of sentence-or-character-level table 420, the metadata associated with the on-demand program may include a field for a current speaker, such as James, as well as an indication of a start of the current speaker's line, such as a starting time stamp for James' line (e.g., "01:00:52") in a debate scene with Linda. Here, the starting time stamp for James' line refers to the time stamp corresponding to the beginning of one of James' continuous lines. In the debate scene between James and Linda, as reflected in table 420 of FIG. 4, which runs from 01:00:52 to 01:33:21, James may begin with a first sentence from 01:00:52 to 01:01:01 (row 422) and a second sentence from 01:01:01 to 01:01:03 (row 424). Linda may respond with a sentence from 01:01:12 to 01:01:51 (row 426) followed by a sentence from 01:01:59 to 01:02:21 (row 428). In accordance with the embodiments discussed herein, if the media guidance application pauses the debate at 01:02:01 (i.e., in the middle of Linda's second sentence during the debate, as shown in row 428), the starting time stamp of Linda's line would be 01:01:12 (i.e. the beginning of her first sentence), and the starting time stamp of Linda's sentence would be 01:01:59.

In this embodiment, the metadata associated with the media asset includes a field for playback information of a recent scene. For example, the metadata associated with the on-demand program may include playback information, such as start and stop time stamps, for the debate scene, as shown in row 416 ("Scene 3") of table 410, in FIG. 4. In some further embodiments, the metadata comprises data on a plurality of commercial breaks associated with the media asset. In this embodiment, the plurality of time stamps corresponds to end times of the plurality of commercial breaks. For example, in some on-demand programs, the metadata associated with a program includes information on commercial break data, such as advertisement start and end times shown on rows 12 and 14 of FIG. 3, which may be used as a proxy for scene or chapter hierarchy of the program. The time stamps of the plurality of positions in the playback hierarchy may correspond to the end times of the commercial breaks. For example, the end time for commercial break as reflected in row 14 of FIG. 3 ("00:05:31") may substantially correspond to one of the plurality of positions in the playback hierarchy, such as the starting time of scene 1 as reflected in row 412 of scene-level table 410.

At 1106, the media guidance application may cause control circuitry 704 to receive, at a first time, first input from a user to pause the media asset at a first position.

At 1108, the media guidance application may cause control circuitry 704 to store the first position in a bookmark for the media asset. Continuing from the examples above, the media guidance application may cause control circuitry 704 to respond to an interrupt generated from user input device 710, which indicates that the user desires to pause the program he or she is currently viewing on display 712.

In this embodiment, the media guidance application may submit the paused position (e.g., "01:02:01" corresponding to the debate scene) as a bookmark to a remote server, such as media content source 816 or media guidance data source 818. In some further embodiments, the media guidance application running at the remote server may receive the paused position and save it in a database as a bookmark. Alternatively, the media guidance application may simply store the paused position locally as a bookmark at storage 708. The media guidance application may later on transmit the paused position to a second device for resuming displaying the program there.

At 1110, the media guidance application may cause control circuitry 704 to receive, at a second time, second input from the user to resume the media asset. In this embodiment, the media guidance application running on user device 700, such as a first user device, may respond to an interrupt generated from user input interface 710 to resume displaying the media asset. In some other embodiments, the media guidance application running on a second user device may receive the instruction to resume the media asset, even though the first instruction to pause is received by the media guidance application running on the first user device. For example, the media guidance application implemented on a television may receive the first user input to pause the on-demand program, e.g., at the end of James' lines in the above-described debate scene, from a remote control of the television. Subsequently, the media guidance application implemented on a cell phone may receive the second user input to resume the on-demand program via a touch screen. In such embodiments, additional features and embodiments as described above are equally applicable. For example, the media guidance application may receive the first user input to pause the on-demand program at 01:02:01, in the middle of Linda's second sentence in the debate scene, at the television. Subsequently, the media guidance application may resume the program at 01:01:59 (i.e., at the start of the sentence), at 01:01:12 (i.e., at the start of Linda's line), or at 01:00:52 (i.e., at the start of the debate scene) from the cell phone in response to receiving the user's input to resume the program from the cell phone.

At 1112, the media guidance application may cause control circuitry 704 to calculate a time period between the first time and the second time. In this embodiment, the time period corresponds to the amount of time that the media asset is paused for, which also corresponds to the amount of time that the user is away for.

At 1114, the media guidance application may cause control circuitry 704 to determine if the time period is greater than the threshold time period as previously configured by the user. As discussed above, the media guidance application may receive user configurations of one or more threshold time periods, such as threshold_1, threshold_2, and threshold_3 of FIG. 4, each of which having a corresponding playback point to indicate where the user desires to have the media guidance application play back the media asset from when the user is away for an amount of time exceeding the threshold time period. In response to determining that the time period is greater than the threshold time period, at 1114, the media guidance application may cause control circuitry 704 to proceed to 1116 and determine a start of a recent scene. In response to determining that the time period is not greater than the threshold, however, the media guidance application may cause control circuitry 704 to determine if the first position (i.e., the pause point or paused position "01:02:01" of table 420) corresponds to the middle of a sentence, at 1124. For example, the media guidance application may keep track of the amount of time that the user has paused the on-demand program by determining a time period between receiving an input to pause the program (e.g., 7:34:00 AM) and receiving another input to resume the program (e.g., 7:36:23 AM). The media guidance application may then compare the time period (e.g., 00:02:23, or 143 seconds) against a threshold time period (e.g., threshold_2, or 5 minutes) to determine whether the time period exceeds the threshold time period. If the media guidance application determines that the threshold time period is exceeded, the media guidance application may determine a start of a recent scene and resume the program from there (i.e., "01:01:12" of the debate scene, as shown in row 426 of table 420), which is discussed in the preceding example. If, however, the threshold time period is not exceeded, as is the case in the present example, the media guidance application may determine if the first position corresponds to the middle of the paused sentence, and, if so, resume from there (i.e., "01:01:59" of row 428 in table 420).

At 1116, the media guidance application may cause control circuitry 704 to determine the start of the recent scene as a second position based on the playback hierarchy. In this embodiment, the media guidance application may determine the second position based on the playback hierarchy as shown in FIG. 3 or FIG. 4. For example, the media guidance application may identify, scene 3 (the "debate scene") and playback information associated with the scene in row 416 of table 410, as well as rows 422, 424, 426, and 428 . . . of table 420, to determine the start of the recent scene, as 01:00:52. In this embodiment, the media guidance application may analyze the playback information of the recent scene to determine the start of the recent scene as the second position.

In this embodiment, the media guidance application may set the start of the recent scene as the second position of the media asset by determining from the playback hierarchy a first time stamp associated with the start of the recent scene; determine from the playback hierarchy a second time stamp associated with an end of the recent scene; compare the first position against the first and second time stamps; and, in response to determining that the first position is before the second time stamp and is after the first time stamp, assigning the first time stamp to the second position. For example, the media guidance application may set the starting time of the recent debate scene between Linda and James (i.e., "01:00:52") as a first time stamp and the end time of the debate scene (i.e., "01:33:21") as a second time stamp. In response to determining that the first position (i.e., "01:02:01", where the program is paused) is before the second time stamp and temporally after the first time stamp, the media guidance application may assign the first time stamp, "01:00:52", corresponding to the start of the debate scene, to the second position to be added to the bookmark.

In this embodiment, the start of the recent scene corresponds to a start of a recent sentence, a start of a recent chapter, a start of a recent episode, or a start of the media asset. For example, the term "recent scene" may be broadly defined to include not just a theatrical scene, but may refer to a sentence of a media asset, a starting line of a character or speaker in the media asset, a scene of a movie, a chapter of a program or movie, an episode of a program series, or the media asset itself. Consequently, the start of the recent scene may refer to the starting time stamp of a sentence, a scene, a chapter, an episode, or a media asset. For example, the media guidance application may receive input from the user to pause the on-demand program at the first position ("01:02:01") and, subsequently, receive input from the user to resume the program. Based on receiving the input from the user to resume the program, the media guidance application may determine that Linda is the speaker who is currently reciting a line when the input to pause is received, and resume the program from the start of Linda's lines ("01:01:12"). In this embodiment, the media guidance application may identify the current speaker based on the playback hierarchy. For example, the paused first position ("01:02:01") corresponds to row 428 of table 420 in the playback hierarchy of FIG. 4, based on which the media guidance application can determine Linda is the speaker.

Continuing from 1114 above, in this embodiment, in response to determining that the time period is not greater than the threshold time period, the media guidance application may cause control circuitry 704 to determine if the first position corresponds to the middle of the sentence, at 1124. In this embodiment, the media guidance application may analyze the metadata to determine that the first position is in-between a start and an end of a recent sentence. For example, the media guidance application may analyze the metadata contained in table 420 to determine that the paused position (at "01:02:01") is in the middle of a sentence at row 428, and resume the on-demand program for the user from the start of the sentence (i.e., "01:01:59") rather than from the start of the scene (i.e., "01:00:52").

In this embodiment, the media guidance application may analyze the metadata to determine that the first position is in-between the start and the end of the recent sentence by updating the playback hierarchy with a plurality of additional time stamps and sentences. For example, in order to determine that the paused first position is in-between the start and end of a recent sentence, the media guidance application may update the playback hierarchy with a plurality of time stamps corresponding to a plurality of sentences in the on-demand program, such that the playback hierarchy for the program contains not only scene-level time stamps (e.g., table 410), but also sentence-level time stamps and character-level time stamps (e.g., table 420).

Continuing from 1124, if the media guidance application causes control circuitry 704 to determine that the first position corresponds to the middle of the sentence, the media guidance application may determine, at 1126, based on the metadata, a second position corresponding to a start of the sentence. For example, once the media guidance application determines that the first position ("01:02:01") is in-between the start ("01:01:59") and end ("01:02:21") of Linda's second sentence in the debate scene, the media guidance application may set the time stamp for the start of the sentence as the second position of the program.

In this embodiment, the media guidance application may even cause control circuitry 704 to generate the media asset for display beginning at the first position itself (i.e., the "pause point"), where the media asset is paused, if the time period is less than the first threshold. For example, if the time period that the user is away for is not greater than the threshold time period of 10 seconds, the media guidance application may resume the program from the first position, i.e., from 01:02:01, where it is paused.

At 1130, the media guidance application may cause control circuitry 704 to use the second position data derived from 1116 and 1126 and update the bookmark to include the second position. The media guidance application may include the second position in addition to, or in lieu of, the first position in the bookmark, either locally or at a remote server. For example, the media guidance application may update the bookmark locally to include the second position (start-of-scene "01:00:52" or start-of-sentence "01:01:59") in addition to the first position ("01:02:01"). Alternatively, the media guidance application may replace the first position ("01:02:01") previously stored in the bookmark and update it with the second position.

At 1132, the media guidance application may cause control circuitry 704 to generate the media asset for display from the bookmark. For example, the media guidance application cause control circuitry 704 to resume generating the program for display from the position stored in the bookmark on display 712.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a user interface request to pause playing of a media asset at a position in the media asset, wherein the user interface request to pause is associated with a user profile;
   receiving, after a period of inactivity indicated by the user profile, a user interface request to resume playing the media asset, wherein the user interface request to resume is associated with the user profile;
   based on determining that the period of inactivity is less than a first threshold, resuming the media asset from the position;
   based on determining that the period of inactivity is greater than the first threshold, resuming the media asset from a shifted position wherein the shifted position is earlier in the media asset by a time duration, and wherein determining the time duration comprises:
      based on determining that the period of inactivity is less than a second threshold, determining the time duration to be a first amount; and
      based on determining that the period of inactivity is greater than the second threshold, determining the time duration to be a second amount, wherein the second amount is greater than the first amount.

2. The method of claim 1,
   wherein the determining the time duration to be the first amount comprises:
      determining an amount of time between: (a) the position in the media asset, wherein the position is within a sentence but not at a beginning of the sentence, and (b) a position in the media asset that corresponds to the beginning of the sentence; and
   wherein the determining the time duration to be the second amount comprises:
      determining an amount of time between: (a) the position in the media asset, wherein the position is within a character's dialogue but not at a beginning of the character's dialogue, and (b) a position in the media asset that corresponds to the beginning of the character's dialogue.

3. The method of claim 2, wherein the beginning of the sentence is determined based at least in part on performing natural language processing analysis of the character's dialogue.

4. The method of claim 3, wherein the beginning of the character's dialogue is determined based at least in part on performing analysis of metadata associated with the media asset.

5. The method of claim 1,
   wherein the determining the time duration to be the first amount comprises:
      determining an amount of time between: (a) the position in the media asset, wherein the position is within a scene but not at a beginning of the scene, and (b) a position in the media asset that corresponds to the beginning of the scene; and
   wherein the determining the time duration to be the second amount comprises:
      determining an amount of time between: (a) the position in the media asset, wherein the position is not at a beginning of the media asset, and (b) a position in the media asset that corresponds to the beginning of the media asset.

6. The method of claim 5, wherein the beginning of the scene is determined based on hierarchy data in metadata associated with the media asset.

7. The method of claim 1, wherein the first threshold and the second threshold are defined based at least in part on user selections in the associated user profile.

8. The method of claim 1, wherein the first amount and the second amount are determined based at least in part on user selections in the associated user profile.

9. The method of claim 1, wherein the user interface request to pause the media asset is received on a first device associated with the user profile and the user interface request to resume the media asset is received on a second device associated with the user profile.

10. A system comprising:
    input circuitry configured to:
       receive a user interface request to pause playing of a media asset at a position in the media asset, wherein the user interface request to pause is associated with a user profile;
       receive, after a period of inactivity indicated by the user profile, a user interface request to resume playing the media asset, wherein the user interface request to resume is associated with the user profile; and
    control circuitry configured to:
       based on determining that the period of inactivity is less than a first threshold, resume the media asset from the position;

based on determining that the period of inactivity is greater than the first threshold, resume the media asset from a shifted position wherein the shifted position is earlier in the media asset by a time duration, and wherein, when determining the time duration, the control circuitry is configured to:
  based on determining that the period of inactivity is less than a second threshold, determine the time duration to be a first amount; and
  based on determining that the period of inactivity is greater than the second threshold, determine the time duration to be a second amount, wherein the second amount is greater than the first amount.

11. The system of claim 10,
wherein, when determining the time duration to be the first amount, the control circuitry is configured to:
  determine an amount of time between: (a) the position in the media asset, wherein the position is within a sentence but not at a beginning of the sentence, and (b) a position in the media asset that corresponds to the beginning of the sentence; and
wherein, when determining the time duration to be the second amount, the control circuitry is configured to:
  determine an amount of time between: (a) the position in the media asset, wherein the position is within a character's dialogue but not at a beginning of the character's dialogue, and (b) a position in the media asset that corresponds to the beginning of the character's dialogue.

12. The system of claim 11, wherein the beginning of the sentence is determined based at least in part on performing natural language processing analysis of the character's dialogue.

13. The system of claim 12, wherein the control circuitry is configured to determine the beginning of the character's dialogue based at least in part on performing analysis of metadata associated with the media asset.

14. The system of claim 10,
wherein, when determining the time duration to be the first amount, the control circuitry is configured to:
  determine an amount of time between: (a) the position in the media asset, wherein the position is within a scene but not at a beginning of the scene, and (b) a position in the media asset that corresponds to the beginning of the scene; and
wherein, when determining the time duration to be the second amount, the control circuitry is configured to:
  determine an amount of time between: (a) the position in the media asset, wherein the position is not at a beginning of the media asset, and (b) a position in the media asset that corresponds to the beginning of the media asset.

15. The system of claim 14, wherein the control circuitry is configured to determine the beginning of the scene based on hierarchy data in metadata associated with the media asset.

16. The system of claim 10, wherein the input circuitry is configured to receive user selections to store in the associated user profile and wherein the control circuitry is configured to define the first threshold and the second threshold based at least in part on the user selections in the associated user profile.

17. The system of claim 10, wherein the input circuitry is configured to receive user selections to store in the associated user profile and wherein the control circuitry is configured to define the first amount and the second amount based at least in part on the user selections in the associated user profile.

18. The system of claim 10, wherein the input circuitry is configured to receive the user interface request to pause the media asset on a first device associated with the user profile and the input circuitry is additionally configured to receive the user interface request to resume the media asset on a second device associated with the user profile.

19. A non-transitory machine-readable medium comprising memory with instructions encoded thereon, comprising:
  instructions for receiving a user interface request to pause playing of a media asset at a position in the media asset, wherein the user interface request to pause is associated with a user profile;
  instructions for receiving, after a period of inactivity indicated by the user profile, a user interface request to resume playing the media asset, wherein the user interface request to resume is associated with the user profile;
  based on instructions for determining that the period of inactivity is less than a first threshold, instructions for resuming the media asset from the position;
  based on instructions for determining that the period of inactivity is greater than the first threshold, instructions for resuming the media asset from a shifted position wherein the shifted position is earlier in the media asset by a time duration, and wherein instructions for determining the time duration comprise:
    based on instructions for determining that the period of inactivity is less than a second threshold, instructions for determining the time duration to be a first amount; and
    based on instructions for determining that the period of inactivity is greater than the second threshold, instructions for determining the time duration to be a second amount, wherein the second amount is greater than the first amount.

20. The non-transitory machine-readable medium of claim 19, wherein the user interface request to pause the media asset is received on a first device associated with the user profile and the user interface request to resume the media asset is received on a second device associated with the user profile.

* * * * *